(12) United States Patent
Chen et al.

(10) Patent No.: US 11,724,344 B2
(45) Date of Patent: Aug. 15, 2023

(54) FLEXIBLE ASSEMBLY SYSTEM AND METHOD

(71) Applicant: SOOCHOW UNIVERSITY, Suzhou (CN)

(72) Inventors: Tao Chen, Suzhou (CN); Yuxiang Tian, Suzhou (CN); Xiandong Tian, Suzhou (CN); Lining Sun, Suzhou (CN); Kejian Ni, Suzhou (CN); Zhiying Huang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/909,188

(22) PCT Filed: Mar. 3, 2021

(86) PCT No.: PCT/CN2021/078811
§ 371 (c)(1),
(2) Date: Sep. 2, 2022

(87) PCT Pub. No.: WO2022/141787
PCT Pub. Date: Jul. 7, 2022

(65) Prior Publication Data
US 2023/0087847 A1    Mar. 23, 2023

(30) Foreign Application Priority Data
Dec. 31, 2020   (CN) .......................... 202011617592.3

(51) Int. Cl.
*B23P 19/00*    (2006.01)
*B23P 21/00*    (2006.01)
(52) U.S. Cl.
CPC ............... *B23P 19/00* (2013.01); *B23P 21/00* (2013.01)

(58) Field of Classification Search
CPC .................................. B23P 19/00; B23P 21/00
See application file for complete search history.

(56) References Cited

U.S. PATENT DOCUMENTS

| | | | | |
|---|---|---|---|---|
| 4,694,230 A | * | 9/1987 | Slocum .................. | G05B 19/42 318/568.17 |
| 10,682,191 B2 | * | 6/2020 | Hourtash ............... | A61B 34/74 |

(Continued)

FOREIGN PATENT DOCUMENTS

| | | |
|---|---|---|
| CN | 103753519 A | 4/2014 |
| CN | 109454653 A | 3/2019 |
| CN | 111299996 A | 6/2020 |

*Primary Examiner* — Jason L Vaughan
(74) *Attorney, Agent, or Firm* — SZDC Law P.C.

(57) ABSTRACT

A flexible assembly system includes an industrial personal computer, a data collection card, a motion control card, a six-degree-of-freedom assembly platform, a first visual platform, a second visual platform and a supporting platform. The six-degree-of-freedom assembly platform includes a four-degree-of-freedom motion platform and a two-degree-of-freedom adjustment device, the two-degree-of-freedom adjustment device includes a two-degree-of-freedom motion platform and a clamping mechanism, and the clamping mechanism includes an outer frame, a flexible wrist rotatably connected in the outer frame, two clamping sheets mounted on the flexible wrist, two driving parts corresponding to the two clamping sheets, two first force sensors provided on the outer frame and two second force sensors provided on the flexible wrist; a first image collection apparatus is mounted on the first visual platform, and a second image collection apparatus is mounted on the second visual platform. A flexible assembly method is also disclosed.

10 Claims, 15 Drawing Sheets

(56) References Cited

U.S. PATENT DOCUMENTS

2017/0144480 A1 5/2017 Kerwin
2019/0381670 A1* 12/2019 Correll .................. B25J 9/1697

* cited by examiner

FLEXIBLE ASSEMBLY SYSTEM AND METHOD

This application is the National Stage Application of PCT/CN2021/078811, filed on Mar. 3, 2021, which claims priority to Chinese Patent Application No. 202011617592.3, filed on Dec. 31, 2020, which is incorporated by reference for all purposes as if fully set forth herein.

FIELD OF THE DISCLOSURE

The present invention relates to the field of micro-assembly technologies, and particularly to a flexible assembly system and method.

BACKGROUND OF THE DISCLOSURE

A micro-assembly technology is important in development of the national defense industry and national economy, and plays an important role in promoting miniaturization and intellectualization of weaponry and improving a performance of civil high-tech products. Therefore, development of a high-precision, high-efficiency, flexible and intelligent assembly robot technology to replace a traditional manual and semi-automatic assembly technology becomes a main development direction and attracts attention of various industrial powers, and the assembly robot technology becomes one of key technological means for meeting rapid, small-batch and customized industry demands.

Currently, a micro-gripper has a large size and is difficult to integrate a sensor to detect external forces; the micro-gripper is easily influenced by gravity of a part, resulting in a low precision of subsequent force detection. Secondly, for tremors in a flexible assembly process of the part, generally, active interference and adjustment are performed dependent on experience of an operator, or the operator waits the part to stabilize autonomously, which may waste assembly time, and requirements for intellectualization and rapidity in the assembly process of the part are unable to be met; furthermore, the operator is also required to concentrate for a long time in an operation process, and is difficult to provide continuous work output. Moreover, in current research in China and foreign countries, micro-vision and visual servo technologies are usually required to be adopted in a micro-assembly system, resulting in relatively complex system design and relatively high requirements for a precision of a visual sensor (camera); in order to ensure that the system can automatically operate, a technology for identifying and positioning a corresponding operating environment and a technology for automatically converting and calibrating a corresponding operating space are also required, and parameters of a conversion matrix (Jacobian matrix) required by system calibration are obtained using system identification, such that comprehensive utilization of multi-source information cannot be realized, such as a technology combining visual navigation and force detection feedback.

SUMMARY OF THE DISCLOSURE

In order to overcome defects in a prior art, an object of the present invention is to provide a flexible assembly system and method.

In order to achieve the above object, the technical solution provided by an embodiment of the present invention is as follows:

A flexible assembly system, comprising an industrial personal computer, a data collection card, a motion control card, a six-degree-of-freedom assembly platform, a first visual platform, a second visual platform and a supporting platform; wherein the data collection card and the motion control card are both connected with the industrial personal computer, the six-degree-of-freedom assembly platform comprises a four-degree-of-freedom motion platform and a two-degree-of-freedom adjustment device, the two-degree-of-freedom adjustment device comprises a two-degree-of-freedom motion platform and a clamping mechanism mounted on the two-degree-of-freedom motion platform, and the clamping mechanism comprises an outer frame, a flexible wrist rotatably connected in the outer frame, two clamping sheets mounted on the flexible wrist, two driving parts corresponding to the two clamping sheets, two first force sensors provided on the outer frame and two second force sensors provided on the flexible wrist; a first image collection apparatus is mounted on the first visual platform, and a second image collection apparatus is mounted on the second visual platform.

As a further improvement of the present invention, wherein the four-degree-of-freedom motion platform comprises a base, a first motor, a second motor, a third motor, a fourth motor, a Y-axis linear motion platform mounted on the base, an X-axis linear motion platform mounted on the Y-axis linear motion platform, a Z-axis linear motion platform mounted on the X-axis linear motion platform, and a Z-axis rotary motion platform mounted on the Z-axis linear motion platform.

As a further improvement of the present invention, wherein the two-degree-of-freedom motion platform comprises a fifth motor, a sixth motor, an X-axis rotary motion platform and a Y-axis rotary motion platform; the fifth motor drives the X-axis rotary motion platform to rotate around the X axis, and the sixth motor drives the Y-axis rotary motion platform to rotate around the Y axis.

As a further improvement of the present invention, wherein the flexible wrist comprises an outer ring and an inner ring, the outer ring is rotatably connected with the outer frame, and the inner ring is rotatably connected with the outer ring; the two clamping sheets are mounted on the inner ring; the two first force sensors are a first outer ring force sensor and a second outer ring force sensor respectively, the two second force sensors are a first inner ring force sensor and a second inner ring force sensor respectively, the first outer ring force sensor and the second outer ring force sensor are oppositely mounted on the outer frame, the first inner ring force sensor and the second inner ring force sensor are oppositely mounted on the outer ring, and the first inner ring force sensor, the second inner ring force sensor, the first outer ring force sensor and the second outer ring force sensor are all connected with the data collection card.

As a further improvement of the present invention, wherein the clamping sheet is an iron sheet, and the driving part is an electromagnet.

As a further improvement of the present invention, wherein the clamping sheet is a piezoelectric ceramic sheet, and the driving part comprises three metal wires.

As a further improvement of the present invention, wherein the metal wire has a diameter of 20 μm.

As a further improvement of the present invention, wherein a mounting hole is provided in the inner ring, a middle part of the mounting hole is connected with a balancing weight, and the balancing weight is provided with at least one balancing weight hole.

A flexible assembly method, in which the system according to the above, comprising the following steps:

(1) a first to-be-assembled part is placed in a clamping region, and a second to-be-assembled part is placed on the supporting platform;

(2) the two clamping sheets are controlled by the industrial personal computer to clamp the first to-be-assembled part;

(3) the industrial personal computer controls the first visual platform and the second visual platform to move through the motion control card, such that the first image collection apparatus and the second image collection apparatus are located at optimal viewing angle positions;

(4) the industrial personal computer acquires image signals of the first image collection apparatus and the second image collection apparatus, so as to obtain a position and a posture of the second to-be-assembled part, controls the six-degree-of-freedom assembly platform to roughly adjust the posture of the first to-be-assembled part, then controls the two-degree-of-freedom adjustment device to stabilize the clamping state of the first to-be-assembled part, and then slowly finishes fine adjustment of the posture of the first to-be-assembled part in a process of controlling the first to-be-assembled part to approach the second to-be-assembled part through the six-degree-of-freedom assembly platform; and (5) in a stage of assembly contact between the first to-be-assembled part and the second to-be-assembled part, the industrial personal computer acquires a force signal for clamping the first to-be-assembled part through the data collection card, and in a deep assembly stage, the industrial personal computer controls the six-degree-of-freedom assembly platform through the motion control card to perform fine movement adjustment, so as to finally complete the assembly of the first to-be-assembled part and the second to-be-assembled part.

As a further improvement of the present invention, wherein the step (4) that the industrial personal computer controls the two-degree-of-freedom adjustment device to stabilize the clamping state of the first to-be-assembled part comprises:

when the industrial personal computer detects a force signal of the first outer ring force sensor, the outer ring is in a state of deflecting leftwards around the X axis in the positive direction of the X axis, and the industrial personal computer controls a two-degree-of-freedom rotary platform to deflect rightwards around the X axis in the positive direction of the X axis; when the industrial personal computer detects that the force signal of the first outer ring force sensor is less than a certain threshold, the outer ring and the first outer ring force sensor are in a contact-free state or an unstressed state;

when the industrial personal computer detects a force signal of the second outer ring force sensor, the outer ring is in a state of deflecting rightwards around the X axis in the positive direction of the X axis, and the industrial personal computer controls the two-degree-of-freedom rotary platform to deflect leftwards around the X axis in the positive direction of the X axis; when the industrial personal computer detects that the force signal of the second outer ring force sensor is less than a certain threshold, the outer ring and the second outer ring force sensor are in a contact-free state or an unstressed state;

when the industrial personal computer detects a force signal of the first inner ring force sensor, the inner ring is in a state of deflecting leftwards around the Y axis in the positive direction of the Y axis, and the industrial personal computer controls the two-degree-of-freedom rotary platform to deflect rightwards around the Y axis in the positive direction of the Y axis; when the industrial personal computer detects that the force signal of the first inner ring force sensor is less than a certain threshold, the inner ring and the first inner ring force sensor are in a contact-free state or an unstressed state;

when the industrial personal computer detects a force signal of the second inner ring force sensor, the inner ring is in a state of deflecting rightwards around the Y axis in the positive direction of the Y axis, and the industrial personal computer controls the two-degree-of-freedom rotary platform to deflect leftwards around the Y axis in the positive direction of the Y axis; when the industrial personal computer detects that the force signal of the second inner ring force sensor is less than a certain threshold, the inner ring and the second inner ring force sensor are in a contact-free state or an unstressed state;

when in the contact-free state or the unstressed state, the outer ring, the first outer ring force sensor and the second outer ring force sensor are in a stable state, and adjustment of the outer ring is finished;

when in the contact-free state or the unstressed state, the inner ring, the first inner ring force sensor and the second inner ring force sensor are in a stable state, and adjustment of the inner ring is finished;

when the adjustment of both the outer ring and the inner ring is finished, adjustment of the currently clamped first to-be-assembled part is finished, and the first to-be-assembled part in a stable state.

The present invention has the beneficial effects as follows.

(1) In the present invention, a structure is simple, a control method is simple and practical, a device cost is low, and tremors in an assembly process of a part can be rapidly eliminated by actively adjusting a strategy, such that part adjustment time is saved, thereby increasing a part assembly efficiency, and improving rapidity and stability of the assembly process; the present invention is intelligent and efficient, has high practicability and is applicable to an application working environment of two-degree-of-freedom flexible rotating assembly.

(2) In the present invention, during micro-assembly, the device may eliminate an influence of gravity of the part on a force detection precision, realize deflection detection of micro-Newton level micro-forces, also realize micro-Newton level force detection for a large-size part clamping scenario, and meanwhile realize an arrangement of a micro-force sensor in a tiny assembly space, thus greatly improving a micro-assembly success rate and efficiency.

(3) The present invention has a wide application range, parts with plural size ranges including small size ranges, medium size ranges and large size ranges may be clamped, a large-size-range clamping aim may be achieved at a front end of a gripper, and a larger axial force may be provided during assembly.

(4) In the present invention, the first inner ring force sensor, the second inner ring force sensor, the first outer ring force sensor and the second outer ring force sensor are all composite-range micro-force sensors; by arranging three cantilever beams with different force detection ranges and force detection precisions in parallel, differences in the force detection ranges and the force detection precisions of the three cantilever beams can be used for organic combination and complementation, and thus, the three cantilever beams are configured to perform corresponding force detection for occasions with different force detection range and/or force detection precision demands, such that the force sensor simultaneously has a large force detection range and a high force detection precision; in addition, force change states of the cantilever beams are detected in real time by corresponding Wheatstone bridge circuits, thereby improving control simplicity and convenience as well as working stability of the force sensor; the micro-force sensor not only improves a force detection resolution, but also enlarges a force measuring range, and force changes are detected by the Wheatstone bridge circuit, such that detection and control methods are simple, and stability is good.

(5) Two-dimensional force detection can be applied to the micro-assembly process, such that force control in the micro-assembly process may be completed using visual navigation in conjunction with micro-force detection, a problem of an influence of the gravity of a micro-part on the high force detection resolution during micro-part assembly is solved, the force detection resolution in the micro-assembly process is improved to a uN level, applicability of the gripper is improved, and applications of a serialization gripper in the micro-assembly process are increased greatly.

BRIEF DESCRIPTION OF DRAWINGS

In order to more clearly explain the technical solutions of the embodiments of the present invention or the prior art, the drawings to be used in the descriptions of the embodiments or the prior art are briefly introduced as follows. Apparently, the following drawings merely illustrate some embodiments of the present invention, and a person skilled in the art can obtain other drawings from these drawings without any creative effort.

DETAILED DESCRIPTION OF PREFERRED EMBODIMENTS

Figure 1:
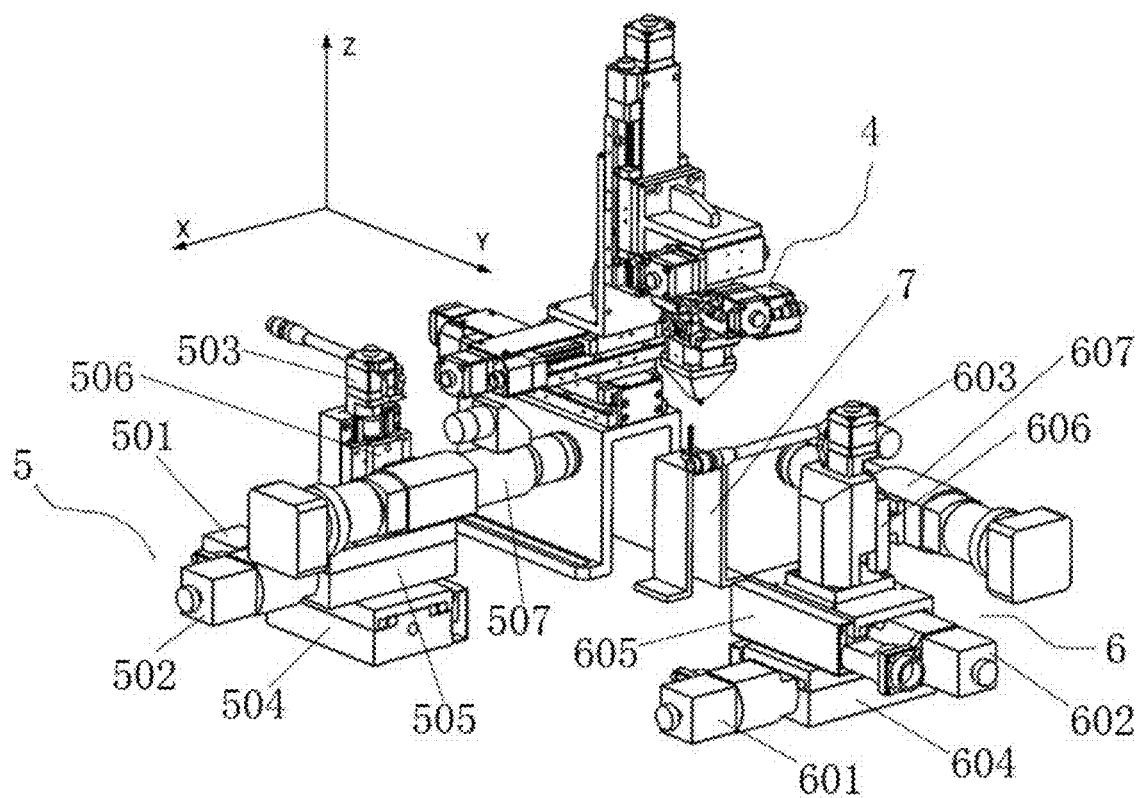
FIG. 1 is a schematic structural diagram according to the present invention.
Figure 2:
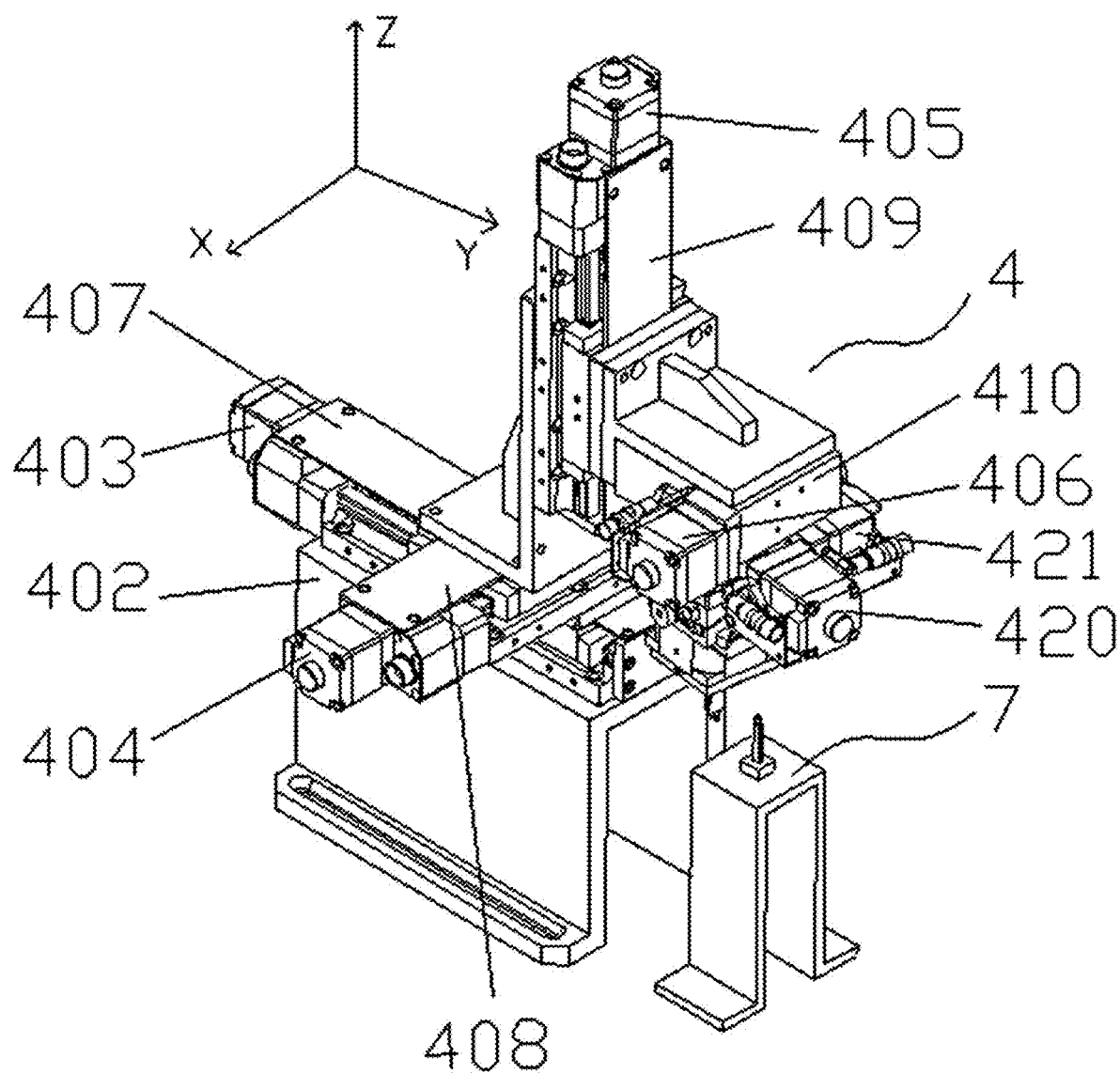
FIG. 2 is a schematic structural diagram of a six-degree-of-freedom assembly platform and a supporting platform in the present invention.
Figure 3:
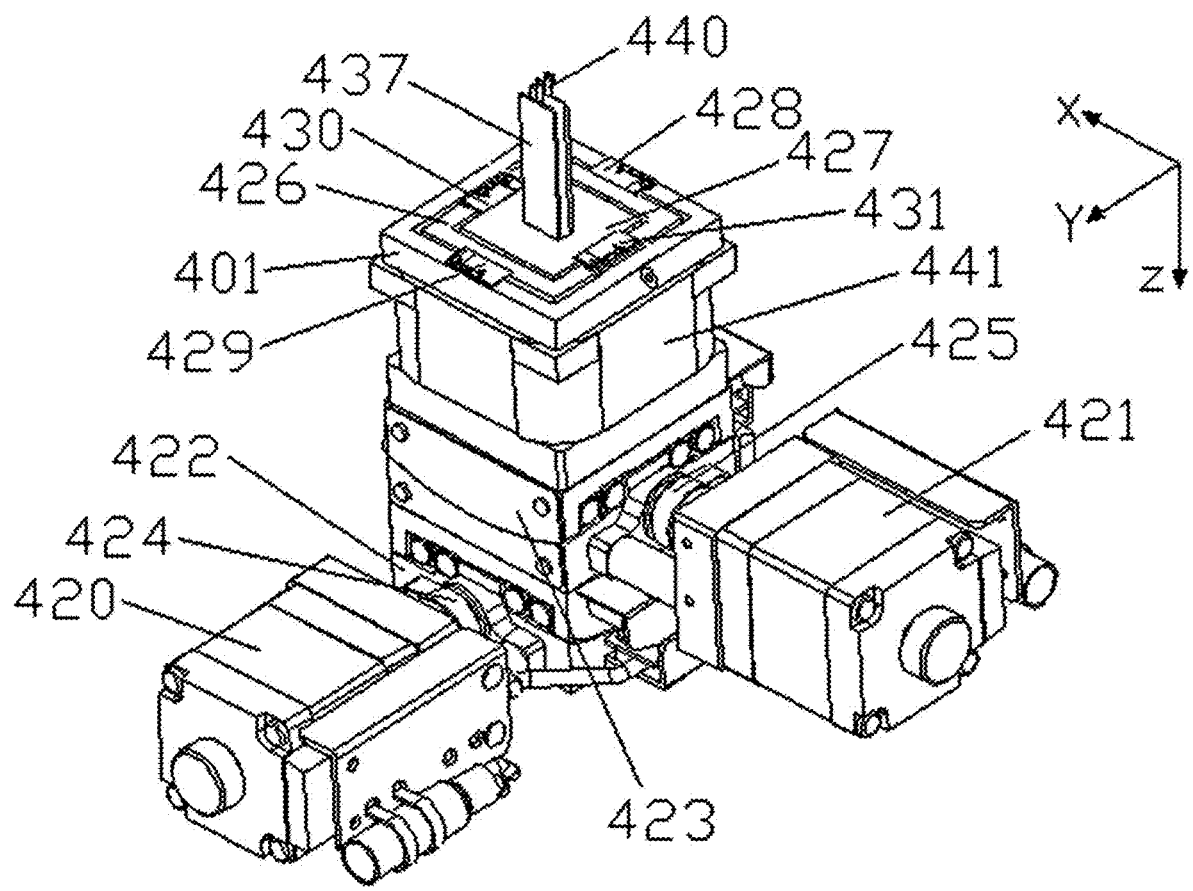
FIG. 3 is a schematic structural diagram of a two-degree-of-freedom adjustment device in a first preferred embodiment of the present invention.
Figure 4:
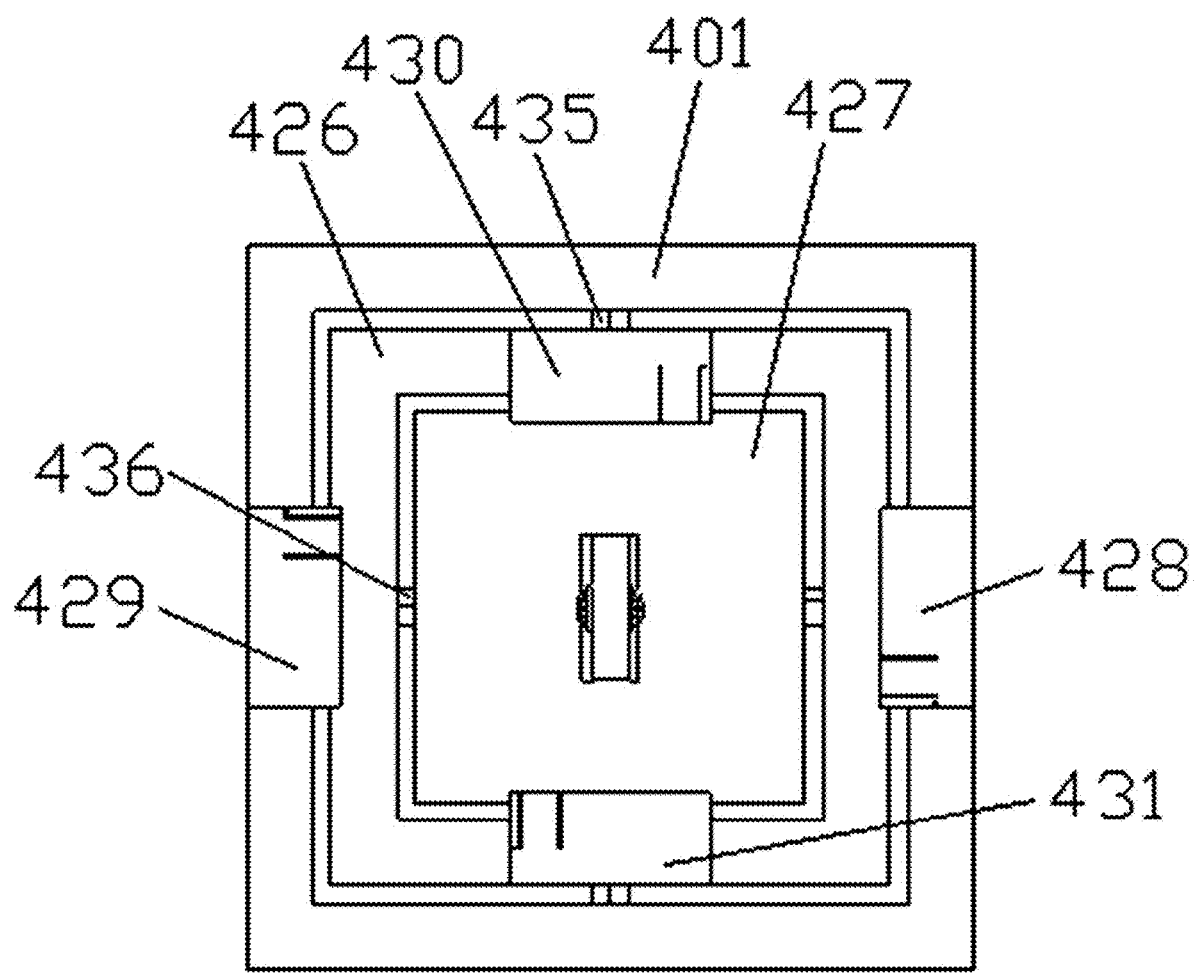
FIG. 4 is a top view of a clamping mechanism in the first preferred embodiment of the present invention.
Figure 5:
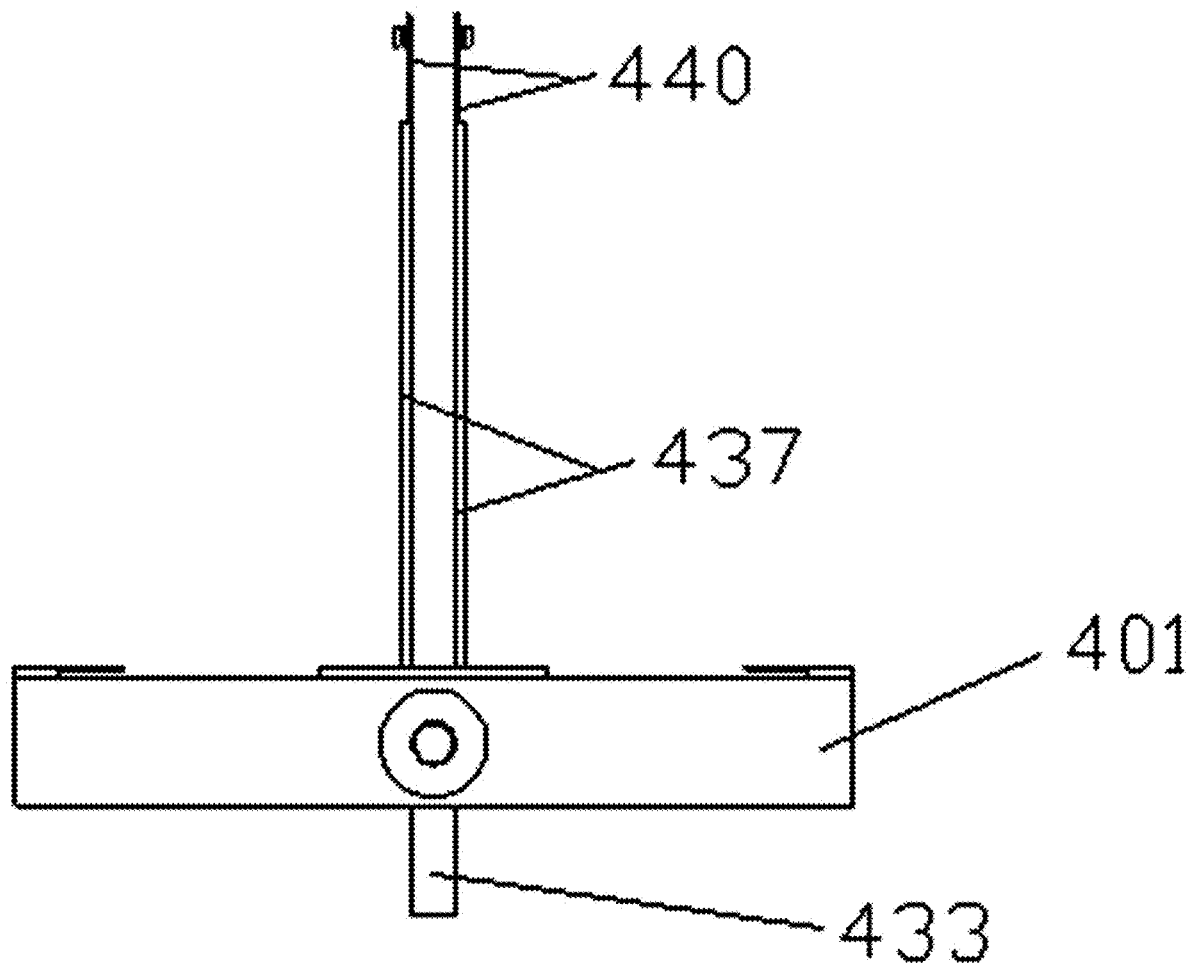
FIG. 5 is a side view of the clamping mechanism in the first preferred embodiment of the present invention.
Figure 6:
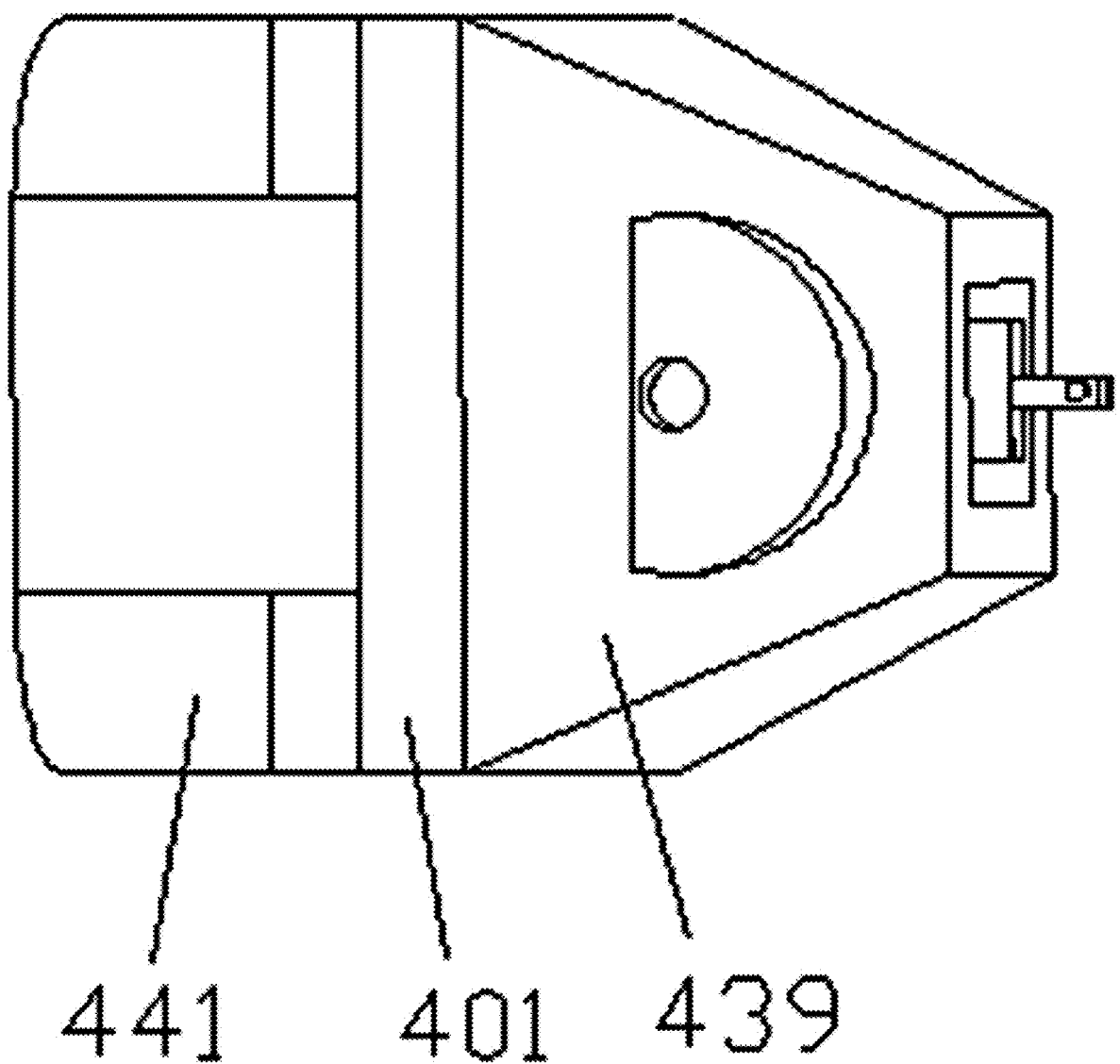
FIG. 6 is a schematic structural diagram of the clamping mechanism in the first preferred embodiment of the present invention.
Figure 7:
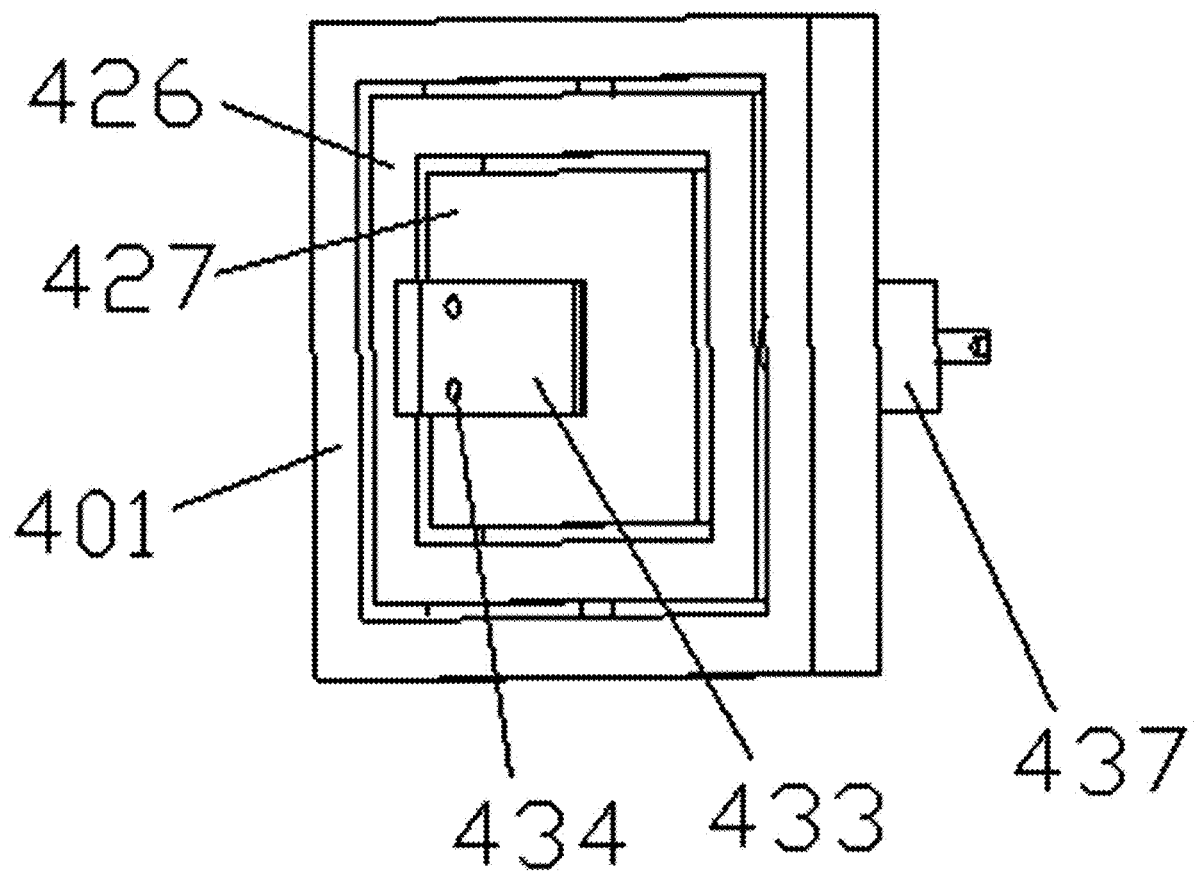
FIG. 7 is a schematic internal structural diagram of the clamping mechanism in the first preferred embodiment of the present invention.
Figure 8:
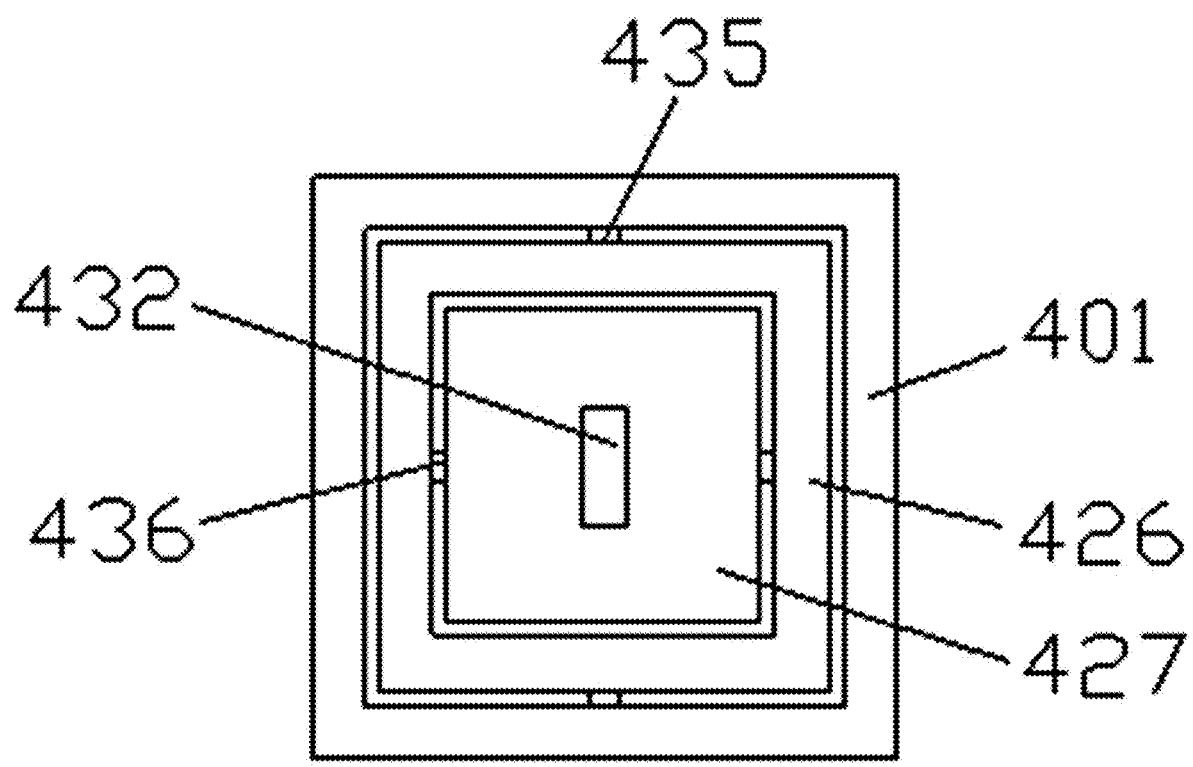
FIG. 8 is a top view of an outer frame and a flexible wrist in the first preferred embodiment of the present invention.
Figure 9:
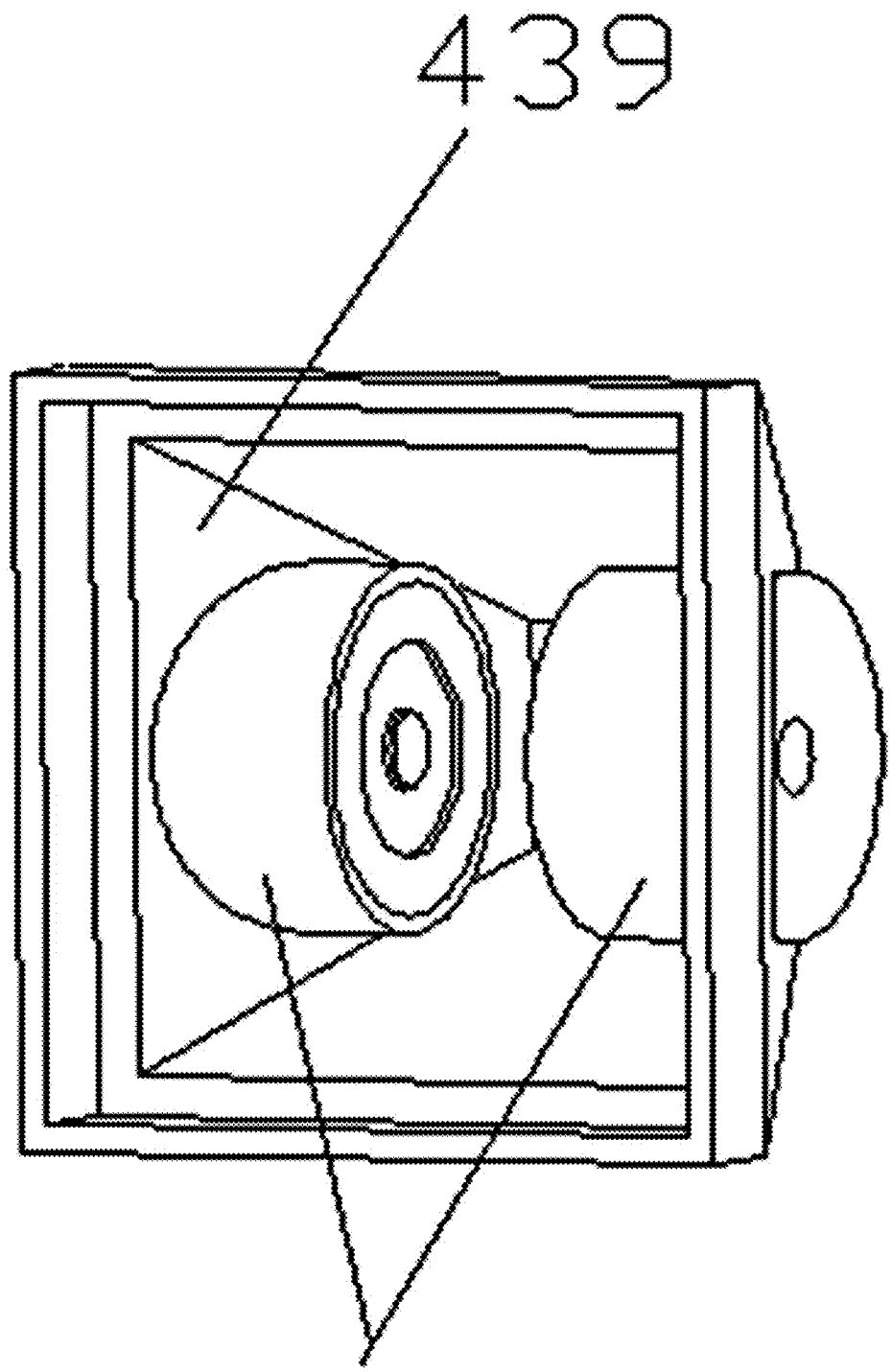
FIG. 9 is a schematic structural diagram in which two electromagnets are provided on a casing in the first preferred embodiment of the present invention.
Figure 10:
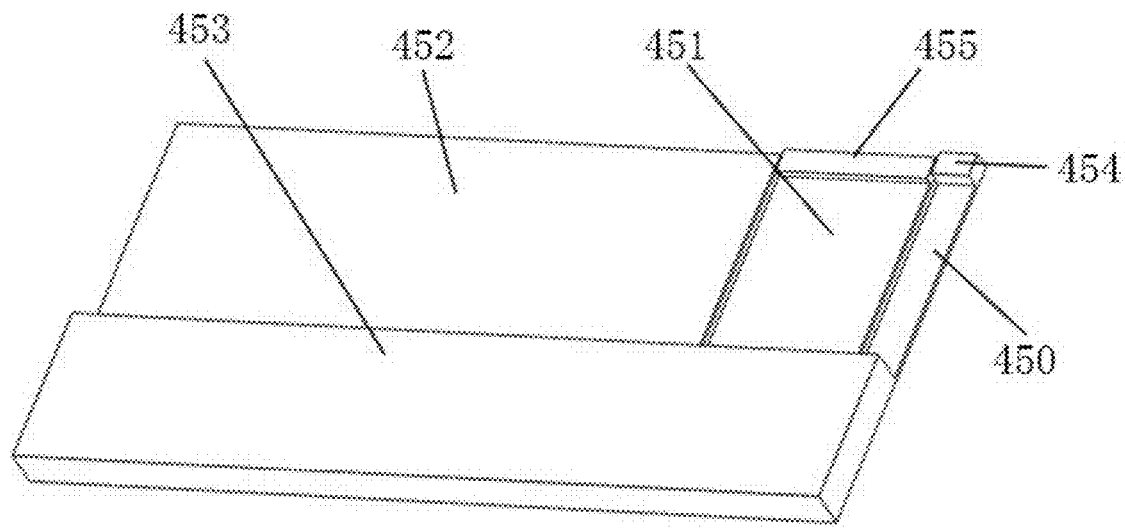
FIG. 10 is a schematic structural diagram of a first inner ring force sensor, a second inner ring force sensor, a first outer ring force sensor and a second outer ring force sensor in the present invention.
Figure 11:
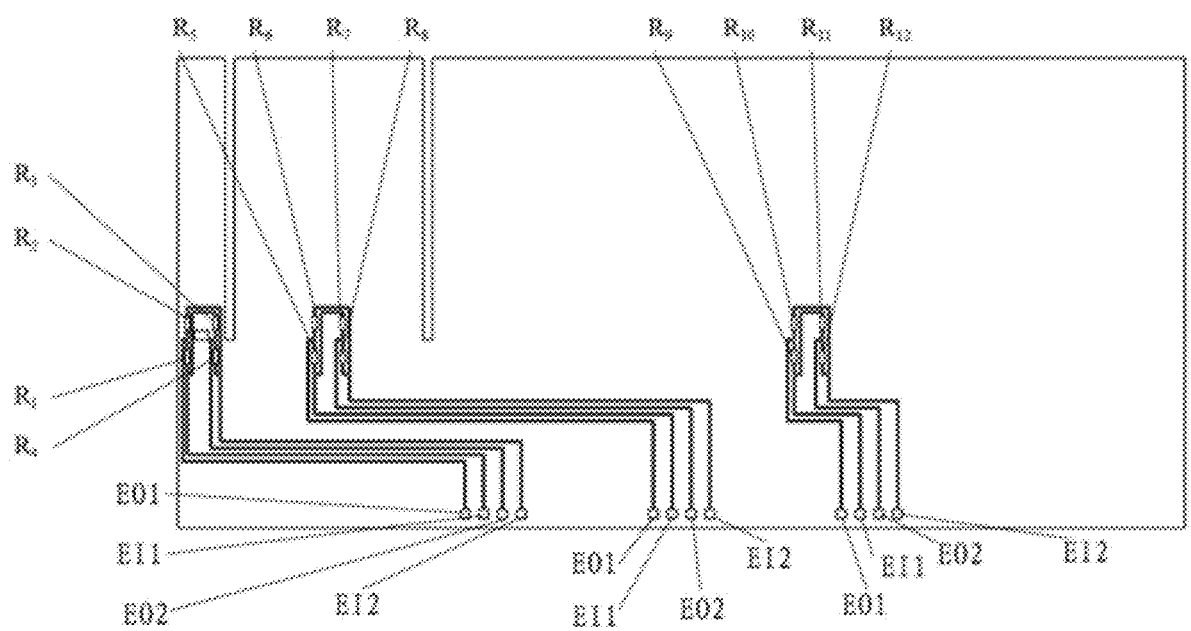
FIG. 11 is a schematic structural diagram of circuit layouts in the first inner ring force sensor, the second inner ring force sensor, the first outer ring force sensor and the second outer ring force sensor in the present invention.

In order to make those skilled in the art better understand the technical solutions in the present invention, the following clearly and completely describes the technical solutions of the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

First Embodiment

As shown in FIGS. 1 to 12, a flexible assembly system includes an industrial personal computer 1, a data collection card 2, a motion control card 3, a six-degree-of-freedom assembly platform 4, a first visual platform 5, a second visual platform 6 and a supporting platform 7; the data collection card 2 and the motion control card 3 are both connected with the industrial personal computer 1, the six-degree-of-freedom assembly platform 4 includes a four-degree-of-freedom motion platform and a two-degree-of-freedom adjustment device, the two-degree-of-freedom adjustment device includes a two-degree-of-freedom motion platform and a clamping mechanism mounted on the two-degree-of-freedom motion platform, and the clamping mechanism includes an outer frame 401, a flexible wrist rotatably connected in the outer frame 401, two clamping sheets mounted on the flexible wrist, two driving parts corresponding to the two clamping sheets, two first force sensors provided on the outer frame 401 and two second force sensors provided on the flexible wrist; a first image collection apparatus is mounted on the first visual platform 5, a second image collection apparatus is mounted on the second visual platform 6, the first visual platform 5 is configured to acquire view field information of an assembly space of a first to-be-assembled part and a second to-be-assembled part in an X-axis direction, the second visual platform 6 is configured to acquire view field information of the assembly space of the first to-be-assembled part and the second to-be-assembled part in a Y-axis direction, and the supporting platform 7 is configured to support the second to-be-assembled part.

In the present invention, preferably, the four-degree-of-freedom motion platform includes a base 402, a first motor 403, a second motor 404, a third motor 405, a fourth motor 406, a Y-axis linear motion platform 407 mounted on the base 402, an X-axis linear motion platform 408 mounted on the Y-axis linear motion platform 407, a Z-axis linear motion platform 409 mounted on the X-axis linear motion platform 408, and a Z-axis rotary motion platform 410 mounted on the Z-axis linear motion platform 409; the first motor 403 can drive the Y-axis linear motion platform 407 to move along a Y axis, the second motor 404 can drive the X-axis linear motion platform 408 to move along an X axis, the third motor 404 can drive the Z-axis linear motion platform 409 to move along a Z axis, and the fourth motor 406 can drive the Z-axis rotary motion platform 410 to rotate around the Z axis. Preferably, the Z-axis rotary motion platform 410 is a standard 360-degree rotary sliding table of Suruga Seiki with a model KRW06360.

Preferably, the two-degree-of-freedom motion platform includes a fifth motor 420, a sixth motor 421, an X-axis rotary motion platform 422 and a Y-axis rotary motion platform 423; the fifth motor 420 drives the X-axis rotary motion platform 422 to rotate around the X axis, and the sixth motor 421 drives the Y-axis rotary motion platform 423 to rotate around the Y axis. Further preferably, an output shaft of the fifth motor 420 is connected with the X-axis rotary motion platform 422 through a first coupling 424, an output shaft of the sixth motor 421 is connected with the Y-axis rotary motion platform 423 through a second coupling 425, and the outer frame 401 is mounted on the Y-axis rotary motion platform 423.

Further preferably, the X-axis rotary motion platform 422 and the Y-axis rotary motion platform 423 are both standard rotary sliding tables of Suruga Seiki with a model KGW04040-L.

In the present invention, preferably, the flexible wrist includes an outer ring 426 and an inner ring 427, the outer ring 426 is rotatably connected with the outer frame 401, and the inner ring 427 is rotatably connected with the outer ring 426; the two clamping sheets are mounted on the inner ring 427; the two first force sensors are a first outer ring force sensor 428 and a second outer ring force sensor 429 respectively, the two second force sensors are a first inner ring force sensor 430 and a second inner ring force sensor 431 respectively, the first outer ring force sensor 428 and the second outer ring force sensor 429 are oppositely mounted on the outer frame 401, the first inner ring force sensor 430 and the second inner ring force sensor 431 are oppositely mounted on the outer ring 426, and the first inner ring force sensor 430, the second inner ring force sensor 431, the first outer ring force sensor 428 and the second outer ring force sensor 429 are all connected with the data collection card 2.

In the present invention, preferably, a mounting hole 432 is provided in the inner ring 427, a middle part of the mounting hole 432 is connected with a balancing weight 433, and weight of the clamping sheet and a clamped part is balanced by the balancing weight 433, such that the inner ring 427 is always kept in a balanced state; the balancing weight 433 is provided with at least one balancing weight hole 434, and after the clamped part is replaced, due to a part weight change, corresponding weight may be added or reduced in the balancing weight hole 434, such that an assembly process is relatively simple, applicability of the clamping sheet is improved, and a cost is reduced.

To facilitate rotation of the outer ring 426 and the inner ring 427, in the present invention, preferably, at least one first pin 435 is connected between the outer ring 426 and the outer frame 401, the outer ring 426 is rotatable about the X axis, at least one second pin 436 is connected between the inner ring 427 and the outer ring 426, and the inner ring 427 is rotatable about the Y axis.

Preferably, the clamping sheet is an iron sheet 437, and the driving part is an electromagnet 438. The two iron sheets 437 are arranged oppositely, the two electromagnets 438 are arranged oppositely, and each iron sheet 437 has one end mounted on the inner ring 427 and the other end passing through a space between the two electromagnets 438. The industrial personal computer 1 is connected with a microcontroller 8, the microcontroller 8 is connected with two electromagnet driving circuits 9, and the two electromagnets 438 are connected with the two electromagnet driving circuits 9 respectively.

In order to facilitate installation of the electromagnets 438, the flexible assembly system further includes a casing 439, the casing 439 is fixedly connected with the outer frame 401, the two electromagnets 438 are mounted on the casing 439, and the other end of each iron sheet 437 extends out of the casing 439. Preferably, one end of each iron sheet 437 is bonded to a side wall of the mounting hole 432, and the balancing weight 433 is bonded to the middle part of the mounting hole 432. Preferably, the other end of each iron sheet 437 is connected with a contact head 440, so as to stably clamp the part. Preferably, the contact head 440 is bonded to the iron sheet 437 by glue.

The flexible assembly system further includes a rear cover 441, and the rear cover 441 is fixedly connected with the outer frame 401.

In order to facilitate starting or stopping of the first motor 403, the second motor 404, the third motor 405, the fourth motor 406, the fifth motor 420, the sixth motor 421, a seventh motor 501, an eighth motor 502, a ninth motor 503, a tenth motor 601, an eleventh motor 602, and a twelfth motor 603, in the present invention, preferably, the motion control card 3 is connected with a plurality of motor drivers 11, and the first motor 403, the second motor 404, the third motor 405, the fourth motor 406, the fifth motor 420, the sixth motor 421, the seventh motor 501, the eighth motor 502, the ninth motor 503, the tenth motor 601, the eleventh motor 602, and the twelfth motor 603 are connected with the corresponding motor drivers 11 respectively.

In the present invention, preferably, the microcontroller 8 is arduino nano. Preferably, the data collection card 2 is a multifunctional data collection card PCI-8062 of ART Corporation. Preferably, the motion control card 3 is a Leadshine 12-axis motion control card DMC3C00. The motor driver 11 preferably has a model KR-A55MB. The electromagnet driving circuit 9 applies a voltage of 12V to the electromagnet 438, and the electromagnet 438 is energized to generate magnetism, so as to attract the iron sheet 437. Preferably, the electromagnet 437 is a direct current electromagnet industrial suction cup LY-1809, DC 12V/attraction force of 1.2 kg.

In the present invention, preferably, the first inner ring force sensor 430, the second inner ring force sensor 431, the first outer ring force sensor 428 and the second outer ring force sensor 429 are all composite-range micro-force sensors, and each include a first cantilever beam 450, a second cantilever beam 451 and a third cantilever beam 452; the first cantilever beam 450, the second cantilever beam 451 and the third cantilever beam 452 are sequentially arranged on a same plane in parallel; the first cantilever beam 450, the second cantilever beam 451 and the third cantilever beam 452 have a same length and a same thickness; the first cantilever beam 450, the second cantilever beam 451 and the third cantilever beam 452 have sequentially increased widths; the first cantilever beam 450 is connected with a first measurement circuit for converting a force signal detected by the first cantilever beam 450 into an electrical signal; the second cantilever beam 451 is connected with a second measurement circuit for converting a force signal detected by the second cantilever beam 451 into an electrical signal; the third cantilever beam 452 is connected with a third measurement circuit for converting a force signal detected by the third cantilever beam 452 into an electrical signal;

detection resolutions of the force signals of the first cantilever beam 450, the second cantilever beam 451 and the third cantilever beam 452 decrease in sequence; detection ranges of the force signals of the first cantilever beam 450, the second cantilever beam 451 and the third cantilever beam 452 increase in sequence.

The technical solution of the above-mentioned composite-range micro-force sensor has the beneficial effects as follows. In the composite-range micro-force sensor, by arranging the three cantilever beams with different force detection ranges and force detection precisions in parallel, differences in the force detection ranges and the force detection precisions of the three cantilever beams can be used for organic combination and complementation, and thus, the three cantilever beams are configured to perform corresponding force detection for occasions with different force detection range and/or force detection precision demands, such that the force sensor simultaneously has a large force detection range and a high force detection precision; in addition, force change states of the cantilever beams are detected in real time by corresponding Wheatstone bridge circuits, thereby improving control simplicity and convenience as well as working stability of the force sensor. Specifically, since the larger the width of the cantilever beam in the force sensor, the wider the corresponding force detection range, and the lower the force detection precision, and conversely, the smaller the width of the cantilever beam in the force sensor, the narrower the corresponding force detection range, and the higher the force detection precision, the composite-range micro-force sensor can perform high-precision and wide-range force value measurement in an actual measurement process by sequentially arranging the three cantilever beams with different widths in parallel, thereby improving measurement reliability and stability of the force sensor.

Preferably, the composite-range micro-force sensor further includes a fixing end surface 453, and the fixing end surface 453 is provided on the same plane; each of the first cantilever beam 450, the second cantilever beam 451 and the third cantilever beam 452 includes a fixed end and a free end arranged oppositely; the fixed ends of the first, second and third cantilever beams 450, 451, 452 are all connected with the fixing end surface 453.

The above technical solution has the following beneficial effects: by providing the fixing end surface on the same plane and jointly arranging the fixed ends of the first, second and third cantilever beams on the fixing end surface, the three cantilever beams can be fixedly mounted effectively, and stability of relative positions of the three cantilever beams can be guaranteed effectively.

Preferably, the free end of the first cantilever beam 450 is provided with a first boss 454; the free end of the second cantilever beam 451 is provided with a second boss 455; the first boss 454 has a height greater than a height of the second boss 455.

The above technical solution has the following beneficial effects: the free ends of the first cantilever beam and the second cantilever beam are provided with the bosses with different heights, and the free end of the third cantilever beam is not provided with any boss, such that the free ends of the three cantilever beams have different relative height positions, and therefore, the three cantilever beams are ensured not to be simultaneously in contact with a to-be-detected micro force signal in the measurement process, and only one cantilever beam is ensured to be in contact with the to-be-detected micro force signal at a same moment, thus guaranteeing measuring accuracy of the force sensor. In actual measurement, since the boss on the free end of the first cantilever beam has the largest height, the first cantilever beam may be firstly in contact with the to-be-detected micro force signal, and the detection process at this point correspondingly has a minimum force detection range and a maximum force detection precision; the corresponding boss of the free end of the second cantilever beam may be in contact with the to-be-detected micro force signal before the first cantilever beam reaches a maximum force detection value; similarly, the free end of the third cantilever beam may be in contact with the to-be-detected micro force signal before the second cantilever beam reaches the maximum force detection value, the detection process at this point correspondingly has the maximum force detection precision, and measurement operations with a wide force detection range and a high force detection precision may be simultaneously realized through the sequentially decreasing measurement processes of the first cantilever beam, the second cantilever beam and the third cantilever beam.

Preferably, the first measurement circuit is a first Wheatstone bridge measurement circuit;

the first Wheatstone bridge measurement circuit includes four force-sensitive resistors R1, R2, R3 and R4;

the force-sensitive resistors R2 and R3 are arranged in a region where the first cantilever beam 450 is deformed most in a stressed state, resistances of the force-sensitive resistors R2 and R3 change with a change of deformation strength of the first cantilever beam 450, the force-sensitive resistors R1 and R4 are arranged on the fixing end surface 453 of the composite-range micro-force sensor, and resistances of the force-sensitive resistors R1 and R4 do not change with the deformation of the first cantilever beam 450.

Preferably, the force-sensitive resistors R1, R2, R3 and R4 are electrically connected end to end in sequence;

connected ends of the force-sensitive resistors R1 and R2 are connected with output electrode EO1 of the first Wheatstone bridge measurement circuit, connected ends of the force-sensitive resistors R1 and R3 are connected with input electrode EI1 of the first Wheatstone bridge measurement circuit, connected ends of the force-sensitive resistors R2 and R4 are connected with input electrode EI2 of the first Wheatstone bridge measurement circuit, and connected ends of the force-sensitive resistors R3 and R4 are connected with output electrode EO2 of the first Wheatstone bridge measurement circuit; the input electrode EI1 and the input electrode EI2 of the first Wheatstone bridge measurement circuit are connected with two ends of an input voltage respectively, and the output electrode EO1 and the output electrode EO2 of the first Wheatstone bridge measurement circuit are configured to output a measurement voltage.

The above technical solution has the following beneficial effects: in actual measurement, the boss of the free end of the first cantilever beam is in contact with the to-be-detected micro force signal, and a root of the first cantilever beam is deformed at this point, such that resistance values of the force-sensitive resistors R2 and R3 are changed with the deformation of the first cantilever beam, the voltage output by the first Wheatstone bridge measurement circuit is changed, and finally, a force value corresponding to the force signal may be calculated according to a proportional relationship between the output voltage and the force signal.

Preferably, the second measurement circuit is a second Wheatstone bridge measurement circuit;

the second Wheatstone bridge measurement circuit includes four force-sensitive resistors R5, R6, R7 and R8;

the force-sensitive resistors R6 and R7 are arranged in a region where the second cantilever beam 451 is deformed most in a stressed state, resistances of the force-sensitive resistors R6 and R7 change with a change of deformation strength of the second cantilever beam 451, the force-sensitive resistors R5 and R8 are arranged on the fixing end surface 453 of the composite-range micro-force sensor, and resistances of the force-sensitive resistors R5 and R8 do not change with the deformation of the second cantilever beam 451.

Preferably, the force-sensitive resistors R5, R6, R3 and R4 are electrically connected end to end in sequence;

connected ends of the force-sensitive resistors R5 and R6 are connected with output electrode EO1 of the second Wheatstone bridge measurement circuit, connected ends of the force-sensitive resistors R5 and R7 are connected with input electrode EI1 of the second Wheatstone bridge measurement circuit, connected ends of the force-sensitive resistors R6 and R8 are connected with input electrode EI2 of the second Wheatstone bridge measurement circuit, and connected ends of the force-sensitive resistors R7 and R8 are connected with output electrode EO2 of the second Wheatstone bridge measurement circuit; the input electrode EI1 and the input electrode EI2 of the second Wheatstone bridge measurement circuit are connected with two ends of an input voltage respectively, and the output electrode EO1 and the output electrode EO2 of the second Wheatstone bridge measurement circuit are configured to output a measurement voltage.

The above technical solution has the following beneficial effects: in actual measurement, the boss of the free end of the second cantilever beam is in contact with the to-be-detected micro force signal, and a root of the second cantilever beam is deformed at this point, such that resistance values of the force-sensitive resistors R6 and R7 are changed with the deformation of the second cantilever beam, the voltage output by the second Wheatstone bridge measurement circuit is changed, and finally, a force value corresponding to the force signal may be calculated according to a proportional relationship between the output voltage and the force signal.

Preferably, the third measurement circuit is a third Wheatstone bridge measurement circuit;

the third Wheatstone bridge measurement circuit includes four force-sensitive resistors R9, R10, R11 and R12; the force-sensitive resistors R10 and R11 are arranged in a region where the third cantilever beam 452 is deformed most in a stressed state, resistances of the force-sensitive resistors R10 and R11 change with a change of deformation strength of the third cantilever beam 452, the force-sensitive resistors R9 and R12 are arranged on the fixing end surface 453 of the composite-range micro-force sensor, and resistances of the force-sensitive resistors R9 and R12 do not change with the deformation of the third cantilever beam 452.

Preferably, the force-sensitive resistors R9, R10, R11 and R12 are electrically connected end to end in sequence;

connected ends of the force-sensitive resistors R9 and R10 are connected with output electrode EO1 of the third Wheatstone bridge measurement circuit, connected ends of the force-sensitive resistors R9 and R11 are connected with input electrode EI1 of the third Wheatstone bridge measurement circuit, connected ends of the force-sensitive resistors R10 and R12 are connected with input electrode EI2 of the third Wheatstone bridge measurement circuit, and connected ends of the force-sensitive resistors R11 and R12 are connected with output electrode EO2 of the third Wheatstone bridge measurement circuit; the input electrode EI1 and the input electrode EI2 of the third Wheatstone bridge measurement circuit are connected with two ends of an input voltage respectively, and the output electrode EO1 and the output electrode EO2 of the third Wheatstone bridge measurement circuit are configured to output a measurement voltage.

The above technical solution has the following beneficial effects: in actual measurement, the free end of the third cantilever beam is in contact with the to-be-detected micro force signal, and a root of the third cantilever beam is deformed at this point, such that resistance values of the force-sensitive resistors R10 and R11 are changed with the deformation of the third cantilever beam, the voltage output by the third Wheatstone bridge measurement circuit is changed, and finally, a force value corresponding to the force signal may be calculated according to a proportional relationship between the output voltage and the force signal.

Preferably, the first cantilever beam 450, the second cantilever beam 451 and the third cantilever beam 452 have lengths of 1,000-3,000 µm; or, the first cantilever beam 450, the second cantilever beam 451 and the third cantilever beam 452 have thicknesses of 50-100 µm; or, the first cantilever beam 450 has a width of 500 µm, the second cantilever beam 451 has a width of 3,000 µm, and the third cantilever beam 452 has a width of 10,000 µm; or; the first cantilever beam 450 has a minimum force signal detection resolution of 10 µN and a force signal detection range of 10-400 µN; or; the second cantilever beam 451 has a minimum force signal detection resolution of 400 µN and a force signal detection range of 400-30,000 µN; or; the third cantilever beam 452 has a minimum force signal detection resolution of 2,000 µN and a force signal detection range of 2,000-250,000 µN; or, the first cantilever beam 450, the second cantilever beam 451 and the third cantilever beam 452 are all fabricated from SiO2 with a photoetching process.

In practical applications, the first cantilever beam 450, the second cantilever beam 451 and the third cantilever beam 452 may have the lengths, widths and heights shown in table 1 below:

TABLE 1

| | Length (µm) | Width (µm) | Thickness (µm) |
| --- | --- | --- | --- |
| First cantilever beam | 3,000 | 500 | 50 |
| Second cantilever beam | 3,000 | 3,000 | 50 |
| Third cantilever beam | 3,000 | 10,000 | 50 |

In particular, the first cantilever beam 450 has a hollowed-out root design, which can ensure that the first cantilever beam 450 has highest force detection sensitivity among the three cantilever beams, which may satisfy a micro-force detection resolution of 20 µN. Optionally, a 100 µm*100 µm square slot may be cut in the root of the first cantilever beam 450.

In practical applications, the first cantilever beam 450, the second cantilever beam 451 and the third cantilever beam 452 may have detection parameters shown in table 2 below:

TABLE 2

|  | Minimum force value (μN) | Maximum force value (μN) | Force detection range (μN) |
|---|---|---|---|
| First cantilever beam | 10 | 1,200 | 10-400 |
| Second cantilever beam | 400 | 40,000 | 400-30,000 |
| Third cantilever beam | 2,000 | 300,000 | 2,000-250,000 |

In addition, a process for fabricating the first, second and third cantilever beams 450, 451 and 452 may include:

(1) thermally growing a layer of SiO2 with a thickness of 25 nm on a surface of a substrate as an ion implantation protective layer;

(2) performing a spin-coating operation to form a layer of photoresist with a thickness of 2 μm on a front surface of the SiO2;

(3) photoetching the photoresist, and etching with the photoresist as a mask to form a force-sensitive resistor groove;

(4) injecting high-concentration boron ions into the force-sensitive resistor groove to form a force-sensitive resistor, the high-concentration boron ions having injection energy of 50 KeV and an injection dosage of 214 cm$^2$; then, annealing the force-sensitive resistor at 1,100° C. for 40 s, and forming an oxide layer with a thickness of 0.3 μm on a surface of the force-sensitive resistor;

(5) etching the photoresist to form a lead wire hole, etching of the lead wire hole corresponding to injection energy of 50 KeV and an injection dosage of 215 cm$^2$; then, performing annealing treatment at 1,100° C. for 40 s;

(6) performing a metal sputtering operation on the lead wire hole to form a 700 nm Al lead wire, and performing annealing treatment at 4,500° C. for 20 min;

(7) performing plasma enhanced chemical vapor deposition on the surface of the substrate to form a SiN insulating medium layer with a thickness of 1 μm;

(8) forming a patterned contact pad on the SiN insulating medium layer; and (9) performing isotropic treatment on the substrate, cutting a reaction cavity and releasing the cantilever beam.

From the above embodiment, the composite-range micro-force sensor includes the first cantilever beam, the second cantilever beam and the third cantilever beam; the first cantilever beam, the second cantilever beam and the third cantilever beam are sequentially arranged on the same plane in parallel; the first cantilever beam, the second cantilever beam and the third cantilever beam have the same length and the same thickness; the first cantilever beam, the second cantilever beam and the third cantilever beam have sequentially increased widths; the first cantilever beam is connected with the first measurement circuit for converting the force signal detected by the first cantilever beam into the electrical signal; the second cantilever beam is connected with the second measurement circuit for converting the force signal detected by the second cantilever beam into the electrical signal; the third cantilever beam is connected with the third measurement circuit for converting the force signal detected by the third cantilever beam into the electrical signal; the detection resolutions of the force signals of the first cantilever beam, the second cantilever beam and the third cantilever beam decrease; the detection ranges of the force signals of the first cantilever beam, the second cantilever beam and the third cantilever beam increase in sequence; thus, in the composite-range micro-force sensor, by arranging the three cantilever beams with different force detection ranges and force detection precisions in parallel, the differences in the force detection ranges and the force detection precisions of the three cantilever beams can be used for organic combination and complementation, and thus, the three cantilever beams are configured to perform corresponding force detection for occasions with different force detection range and/or force detection precision demands, such that the force sensor simultaneously has a large force detection range and a high force detection precision; in addition, the force change states of the cantilever beams are detected in real time by the corresponding Wheatstone bridge circuits, thereby improving the control simplicity and convenience as well as the working stability of the force sensor.

In the present invention, preferably, the first visual platform 5 includes the seventh motor 501, the eighth motor 502, the ninth motor 503, a first visual Y-axis motion platform 504, a first visual X-axis motion platform 505, and a first visual Z-axis motion platform 506; the seventh motor 501 drives the first visual Y-axis motion platform 504 to move along the Y axis, the eighth motor 502 drives the first visual X-axis motion platform 505 to move along the X axis, and the ninth motor 503 drives the first visual Z-axis motion platform 506 to move along the Z axis.

In the present invention, preferably, the second visual platform 6 includes the tenth motor 601, the eleventh motor 602, the twelfth motor 603, a second visual X-axis motion platform 604, a second visual Y-axis motion platform 605, and a second visual Z-axis motion platform 606; the tenth motor 601 drives the second visual X-axis motion platform 604 to move along the X axis, the eleventh motor 602 drives the second visual Y-axis motion platform 605 to move along the Y axis, and the twelfth motor 603 drives the second visual Z-axis motion platform 606 to move along the Z axis. Further preferably, the first image collection apparatus is a first CCD camera 507, and the second image collection apparatus is a second CCD camera 607. Further preferably, the system further includes an image collection card 10, the first CCD camera 507 and the second CCD camera 607 are both connected with the image collection card 10, and the image collection card 10 is connected with the industrial personal computer 1.

A flexible assembly method according to the first embodiment of the present invention is described below, in which the flexible assembly system according to the first embodiment of the present invention is used, and the flexible assembly method includes the following steps:

(1) a first to-be-assembled part is placed in a clamping region, and a second to-be-assembled part is placed on the supporting platform 7.

Before the first to-be-assembled part is placed in the clamping region, the method further includes: a signal is sent to the microcontroller 8 by the industrial personal computer 1, the electromagnet driving circuits 9 control the two electromagnets 438 to be energized, and the two electromagnets 438 attract the two iron sheets 437 respectively to open front ends of the two iron sheets 437 by a certain angle.

The clamping region is a region between the two contact heads 440, thus improving stability of clamping the first to-be-assembled part.

(2) The two clamping sheets are controlled by the industrial personal computer 1 to clamp the first to-be-assembled part.

Specifically, a signal is sent to the microcontroller 8 by the industrial personal computer 1, the microcontroller 8 sends a signal to the electromagnet driving circuit 9, the electromagnet driving circuit 9 interrupts power of the electromagnet 438, the electromagnet 438 is demagnetized, and the iron sheet 437 recovers from deformation, thus clamping the first to-be-assembled part.

(3) The industrial personal computer 1 controls the first visual platform 5 and the second visual platform 6 to move through the motion control card 3, such that the first image collection apparatus and the second image collection apparatus are located at optimal viewing angle positions.

Specifically, the motion control card 3 controls the seventh motor 501, the eighth motor 502 and the ninth motor 503 to work through the motor drivers 11, and then controls the first visual Y-axis motion platform 504, the first visual X-axis motion platform 505 and the first visual Z-axis motion platform 506 to move, such that the first CCD camera 507 is located at the optimal viewing angle position; meanwhile, the motion control card 3 controls the tenth motor 601, the eleventh motor 602 and the twelfth motor 603 to work through the motor drivers 11, and then controls the second visual X-axis motion platform 604, the second visual Y-axis motion platform 605 and the second visual Z-axis motion platform 606 to move, such that the second CCD camera 607 is located at the optimal viewing angle position.

(4) The industrial personal computer 1 acquires image signals of the first image collection apparatus and the second image collection apparatus, so as to obtain a position and a posture of the second to-be-assembled part, controls the six-degree-of-freedom assembly platform 4 to roughly adjust the posture of the first to-be-assembled part, then controls the two-degree-of-freedom adjustment device to stabilize the clamping state of the first to-be-assembled part, and then slowly finishes fine adjustment of the posture of the first to-be-assembled part in a process of controlling the first to-be-assembled part to approach the second to-be-assembled part through the six-degree-of-freedom assembly platform 4.

Specifically, the industrial personal computer 1 acquires the image signals of the first CCD camera 507 and the second CCD camera 607 through the image collection card 10, thereby acquiring the position and the posture of the second to-be-assembled part.

Specifically, the industrial personal computer 1 controls the motor drivers 11 through the motion control card 3, and the motor drivers 11 control the fourth motor 406, the fifth motor 420 and the sixth motor 421 to control the Z-axis rotary motion platform 410, the X-axis rotary motion platform 422 and the Y-axis rotary motion platform 423 to rotate, so as to drive the first to-be-assembled part to rotate, thus realizing the coarse adjustment of the posture of the first to-be-assembled part.

When the industrial personal computer 1 detects a force signal of the first outer ring force sensor 428 through the data collection card 2, the outer ring 426 is in a state of deflecting leftwards around the X axis in the positive direction of the X axis, the industrial personal computer 1 sends a signal to the motion control card 3, the motion control card 3 sends a signal to the motor driver 11, and the fifth motor 420 drives the X-axis rotary motion platform 422 to deflect rightwards around the X axis in the positive direction of the X axis; when the industrial personal computer 1 detects through the data collection card 2 that the force signal of the first outer ring force sensor 428 is less than a certain threshold, the outer ring 426 and the first outer ring force sensor 428 are in a contact-free state or an unstressed state;

when the industrial personal computer 1 detects a force signal of the second outer ring force sensor 429 through the data collection card 2, the outer ring 426 is in a state of deflecting rightwards around the X axis in the positive direction of the X axis, the industrial personal computer 1 sends a signal to the motion control card 3, the motion control card 3 sends a signal to the motor driver 11, and the fifth motor 420 drives the X-axis rotary motion platform 422 to deflect leftwards around the X axis in the positive direction of the X axis; when the industrial personal computer 1 detects through the data collection card 2 that the force signal of the second outer ring force sensor 429 is less than a certain threshold, the outer ring 426 and the second outer ring force sensor 429 are in a contact-free state or an unstressed state;

when the industrial personal computer 1 detects a force signal of the first inner ring force sensor 430 through the data collection card 2, the inner ring 427 is in a state of deflecting leftwards around the Y axis in the positive direction of the Y axis, the industrial personal computer 1 sends a signal to the motion control card 3, the motion control card 3 sends a signal to the motor driver 11, and the sixth motor 421 drives the Y-axis rotary motion platform 423 to deflect rightwards around the Y axis in the positive direction of the Y axis; when the industrial personal computer 1 detects through the data collection card 2 that the force signal of the first inner ring force sensor 430 is less than a certain threshold, the inner ring 427 and the first inner ring force sensor 430 are in a contact-free state or an unstressed state;

when the industrial personal computer 1 detects a force signal of the second inner ring force sensor 431 through the data collection card 2, the inner ring 427 is in a state of deflecting rightwards around the Y axis in the positive direction of the Y axis, the industrial personal computer 1 sends a signal to the motion control card 3, the motion control card 3 sends a signal to the motor driver 11, and the sixth motor 421 drives the Y-axis rotary motion platform 423 to deflect leftwards around the Y axis in the positive direction of the Y axis; when the industrial personal computer 1 detects through the data collection card 2 that the force signal of the second inner ring force sensor 431 is less than a certain threshold, the inner ring 427 and the second inner ring force sensor 431 are in a contact-free state or an unstressed state;

when in the contact-free state or the unstressed state, the outer ring 426, the first outer ring force sensor 428 and the second outer ring force sensor 429 are in a stable state, and adjustment of the outer ring 426 is finished;

when in the contact-free state or the unstressed state, the inner ring 427, the first inner ring force sensor 430 and the second inner ring force sensor 431 are in a stable state, and adjustment of the inner ring 427 is finished;

when the adjustment of both the outer ring 426 and the inner ring 427 is finished, adjustment of the currently clamped first to-be-assembled part is finished, and the first to-be-assembled part in a stable state.

(5) In a stage of assembly contact between the first to-be-assembled part and the second to-be-assembled part, the industrial personal computer 1 acquires a force signal for clamping the first to-be-assembled part through the data collection card 2, so as to acquire an assembly contact state of the first to-be-assembled part and the second to-be-assembled part in real time, and control the corresponding motor to make corresponding position adjustment, and in a deep assembly stage, the industrial personal computer 1 controls the six-degree-of-freedom assembly platform 4 through the motion control card 3 to perform fine movement adjustment, so as to finally complete the assembly of the first to-be-assembled part and the second to-be-assembled part.

Second Embodiment

As shown in FIGS. 1, 2, 10, 11 and 13 to 16, a flexible assembly system according to the second embodiment of the present invention is different from the flexible assembly system according to the first embodiment in that:

the clamping sheet is a piezoelectric ceramic sheet 460, and the driving part includes three metal wires. Preferably, the piezoelectric ceramic sheet 460 has three wiring terminals (not shown), and the three metal wires are welded to the three wiring terminals respectively. Preferably, the metal wire has a diameter of 20 μm, which can realize welding to the wiring terminal without melt, and meanwhile can avoid an influence on rotation of the inner ring 427. Preferably, the metal wire is a silver wire 461, but is not limited to a silver wire, and may also be a gold wire. Preferably, a piezoelectric ceramic sheet driving circuit 12 is further provided, the microcontroller 8 is connected with the piezoelectric ceramic sheet driving circuit 12, and the piezoelectric ceramic sheet driving circuit 12 is connected with the piezoelectric ceramic sheet 460 by the three silver wires 461. In the present embodiment, preferably, the piezoelectric ceramic sheet driving circuit 12 is a 150V three-channel power source, and a model is an HPV series piezoelectric ceramic driving power supply system.

The second embodiment further provides a flexible assembly method, in which the flexible assembly system according to the second embodiment of the present invention is used, and the flexible assembly method includes the following steps:

(1) a first to-be-assembled part is placed in a clamping region, and a second to-be-assembled part is placed on the supporting platform 7.

The clamping region is a region between the two contact heads 440, thus improving stability of clamping the first to-be-assembled part.

(2) The two clamping sheets are controlled by the industrial personal computer 1 to clamp the first to-be-assembled part.

Specifically, a signal is sent to the microcontroller 8 by the industrial personal computer 1, the microcontroller 8 sends a signal to the piezoelectric ceramic sheet driving circuit 12, the piezoelectric ceramic sheet driving circuit 12 energizes the silver wire 461, and the piezoelectric ceramic sheet 460 is bent to clamp the first to-be-assembled part.

(3) The industrial personal computer 1 controls the first visual platform 5 and the second visual platform 6 to move through the motion control card 3, such that the first image collection apparatus and the second image collection apparatus are located at optimal viewing angle positions.

Specifically, the motion control card 3 controls the seventh motor 501, the eighth motor 502 and the ninth motor 503 to work through the motor drivers 11, and then controls the first visual Y-axis motion platform 504, the first visual X-axis motion platform 505 and the first visual Z-axis motion platform 506 to move, such that the first CCD camera 507 is located at the optimal viewing angle position; meanwhile, the motion control card 3 controls the tenth motor 601, the eleventh motor 602 and the twelfth motor 603 to work through the motor drivers 11, and then controls the second visual X-axis motion platform 604, the second visual Y-axis motion platform 605 and the second visual Z-axis motion platform 606 to move, such that the second CCD camera 607 is located at the optimal viewing angle position.

(4) The industrial personal computer 1 acquires image signals of the first image collection apparatus and the second image collection apparatus, so as to obtain a position and a posture of the second to-be-assembled part, controls the six-degree-of-freedom assembly platform 4 to roughly adjust the posture of the first to-be-assembled part, then controls the two-degree-of-freedom adjustment device to stabilize the clamping state of the first to-be-assembled part, and then slowly finishes fine adjustment of the posture of the first to-be-assembled part in a process of controlling the first to-be-assembled part to approach the second to-be-assembled part through the six-degree-of-freedom assembly platform 4.

Specifically, the industrial personal computer 1 acquires the image signals of the first CCD camera 507 and the second CCD camera 607 through the image collection card 10, thereby acquiring the position and the posture of the second to-be-assembled part.

Specifically, the industrial personal computer 1 controls the motor drivers 11 through the motion control card 3, and the motor drivers 11 control the fourth motor 406, the fifth motor 420 and the sixth motor 421 to control the Z-axis rotary motion platform 410, the X-axis rotary motion platform 422 and the Y-axis rotary motion platform 423 to rotate, so as to drive the first to-be-assembled part to rotate, thus realizing the coarse adjustment of the posture of the first to-be-assembled part.

When the industrial personal computer 1 detects a force signal of the first outer ring force sensor 428 through the data collection card 2, the outer ring 426 is in a state of deflecting leftwards around the X axis in the positive direction of the X axis, the industrial personal computer 1 sends a signal to the motion control card 3, the motion control card 3 sends a signal to the motor driver 11, and the fifth motor 420 drives the X-axis rotary motion platform 422 to deflect rightwards around the X axis in the positive direction of the X axis; when the industrial personal computer 1 detects through the data collection card 2 that the force signal of the first outer ring force sensor 428 is less than a certain threshold, the outer ring 426 and the first outer ring force sensor 428 are in a contact-free state or an unstressed state;

when the industrial personal computer 1 detects a force signal of the second outer ring force sensor 429 through the data collection card 2, the outer ring 426 is in a state of deflecting rightwards around the X axis in the positive direction of the X axis, the industrial personal computer 1 sends a signal to the motion control card 3, the motion control card 3 sends a signal to the motor driver 11, and the fifth motor 420 drives the X-axis rotary motion platform 422 to deflect leftwards around the X axis in the positive direction of the X axis; when the industrial personal computer 1 detects through the data collection card 2 that the force signal of the second outer ring force sensor 429 is less than a certain threshold, the outer ring 426 and the second outer ring force sensor 429 are in a contact-free state or an unstressed state;

when the industrial personal computer 1 detects a force signal of the first inner ring force sensor 430 through the data collection card 2, the inner ring 427 is in a state of deflecting leftwards around the Y axis in the positive direction of the Y axis, the industrial personal computer 1 sends a signal to the motion control card 3, the motion control card 3 sends a signal to the motor driver 11, and the sixth motor 421 drives the Y-axis rotary motion platform 423 to deflect rightwards around the Y axis in the positive direction of the Y axis; when the industrial personal computer 1 detects through the data collection card 2 that the force signal of the first inner ring force sensor 430 is less than a certain threshold, the inner ring 427 and the first inner ring force sensor 430 are in a contact-free state or an unstressed state;

when the industrial personal computer 1 detects a force signal of the second inner ring force sensor 431 through the data collection card 2, the inner ring 427 is in a state of deflecting rightwards around the Y axis in the positive direction of the Y axis, the industrial personal computer 1 sends a signal to the motion control card 3, the motion control card 3 sends a signal to the motor driver 11, and the sixth motor 421 drives the Y-axis rotary motion platform 423 to deflect leftwards around the Y axis in the positive direction of the Y axis; when the industrial personal computer 1 detects through the data collection card 2 that the force signal of the second inner ring force sensor 431 is less than a certain threshold, the inner ring 427 and the second inner ring force sensor 431 are in a contact-free state or an unstressed state;

when in the contact-free state or the unstressed state, the outer ring 426, the first outer ring force sensor 428 and the second outer ring force sensor 429 are in a stable state, and adjustment of the outer ring 426 is finished;

when in the contact-free state or the unstressed state, the inner ring 427, the first inner ring force sensor 430 and the second inner ring force sensor 431 are in a stable state, and adjustment of the inner ring 427 is finished;

when the adjustment of both the outer ring 426 and the inner ring 427 is finished, adjustment of the currently clamped first to-be-assembled part is finished, and the first to-be-assembled part in a stable state.

(5) In a stage of assembly contact between the first to-be-assembled part and the second to-be-assembled part, the industrial personal computer 1 acquires a force signal for clamping the first to-be-assembled part through the data collection card 2, so as to acquire an assembly contact state of the first to-be-assembled part and the second to-be-assembled part in real time, and control the corresponding motor to make corresponding position adjustment, and in a deep assembly stage, the industrial personal computer 1 controls the six-degree-of-freedom assembly platform 4 through the motion control card 3 to perform fine movement adjustment, so as to finally complete the assembly of the first to-be-assembled part and the second to-be-assembled part.

Specifically, the industrial personal computer 1 acquires the force signals of the first outer ring force sensor 428, the second outer ring force sensor 429, the first inner ring force sensor 430 and the second inner ring force sensor 431 through the data collection card 2, so as to acquire the force signal for clamping the first to-be-assembled part, thereby acquiring the assembly contact state of the first to-be-assembled part and the second to-be-assembled part in real time; then, the respective motor drivers 11 drive the corresponding motors to rotate through the motion control card 3, thus rotating the first to-be-assembled part; in the deep assembly stage, the respective motor drivers 11 drive the first motor 403, the second motor 403 and the third motor 405 through the motion control card 3 to realize the fine movement adjustment of the first to-be-assembled part in the X-axis direction, the Y-axis direction and the Z-axis direction, so as to finally finish the assembly of the first to-be-assembled part and the second to-be-assembled part.

It will be evident to those skilled in the art that the invention is not limited to the details of the foregoing illustrative embodiments, and that the present invention may be embodied in other specific forms without departing from the spirit or essential attributes thereof. The embodiments are therefore to be considered in all respects as illustrative and not restrictive, the scope of the invention is defined by the appended claims rather than by the foregoing description, and all changes which come within the meaning and range of equivalency of the claims are therefore intended to be embraced therein. Any reference numeral in a claim should not be construed as limiting the claim concerned.

Furthermore, it should be understood that although the specification is described in terms of the embodiments, not every embodiment only includes an independent technical solution, and such description of the specification is for clarity only; those skilled in the art should take the specification as a whole, and the technical solutions in various embodiments may also be appropriately combined to form other embodiments that may be understood by those skilled in the art.

REFERENCE NUMERALS

Figure 12:
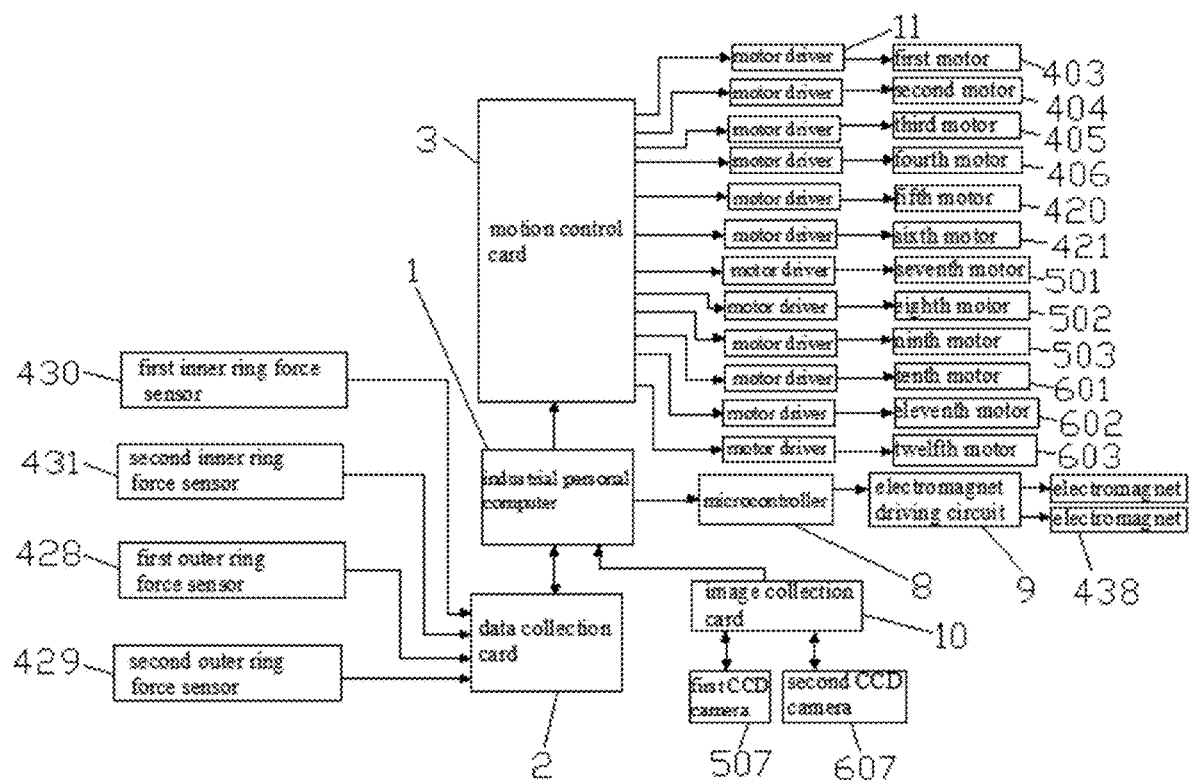
FIG. 12 is a control principle diagram in the first preferred embodiment of the present invention.
Figure 13:
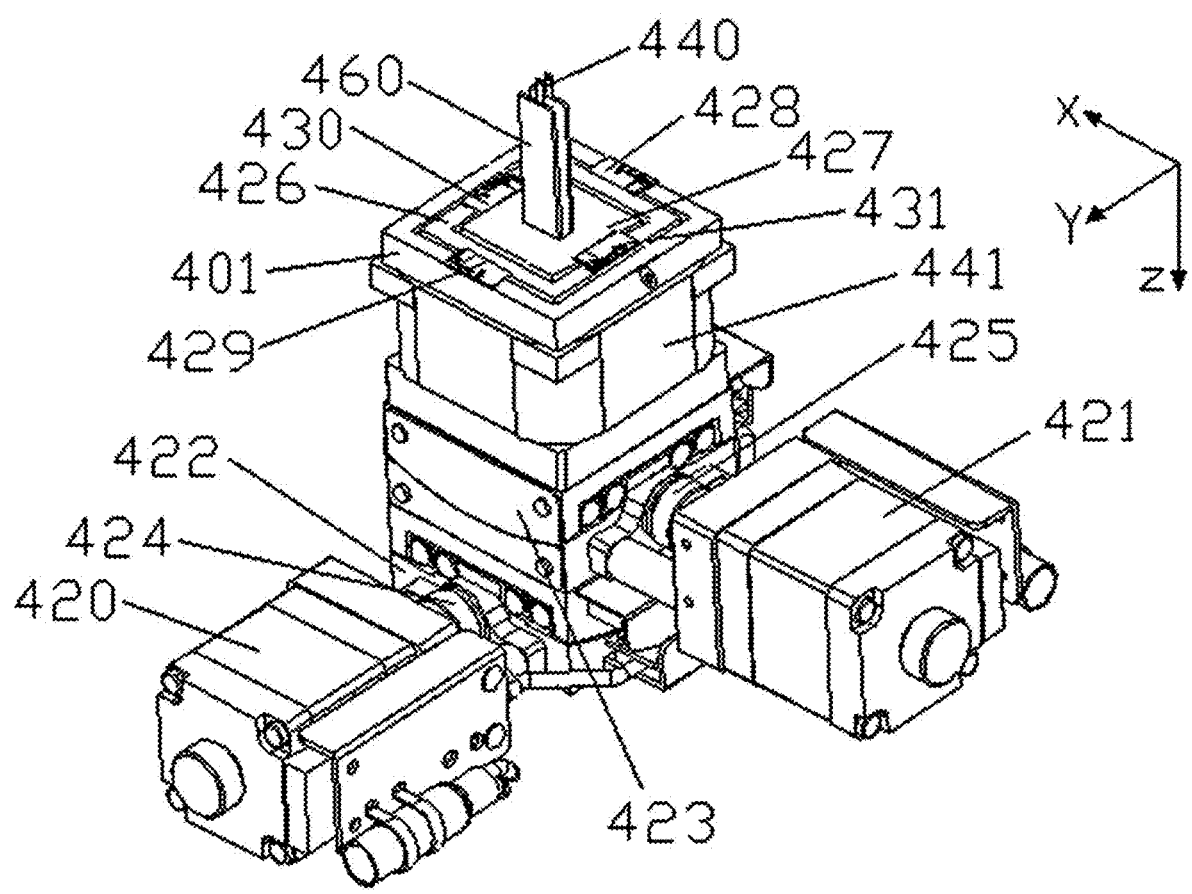
FIG. 13 is a schematic structural diagram of a two-degree-of-freedom adjustment device in a second preferred embodiment of the present invention.
Figure 14:
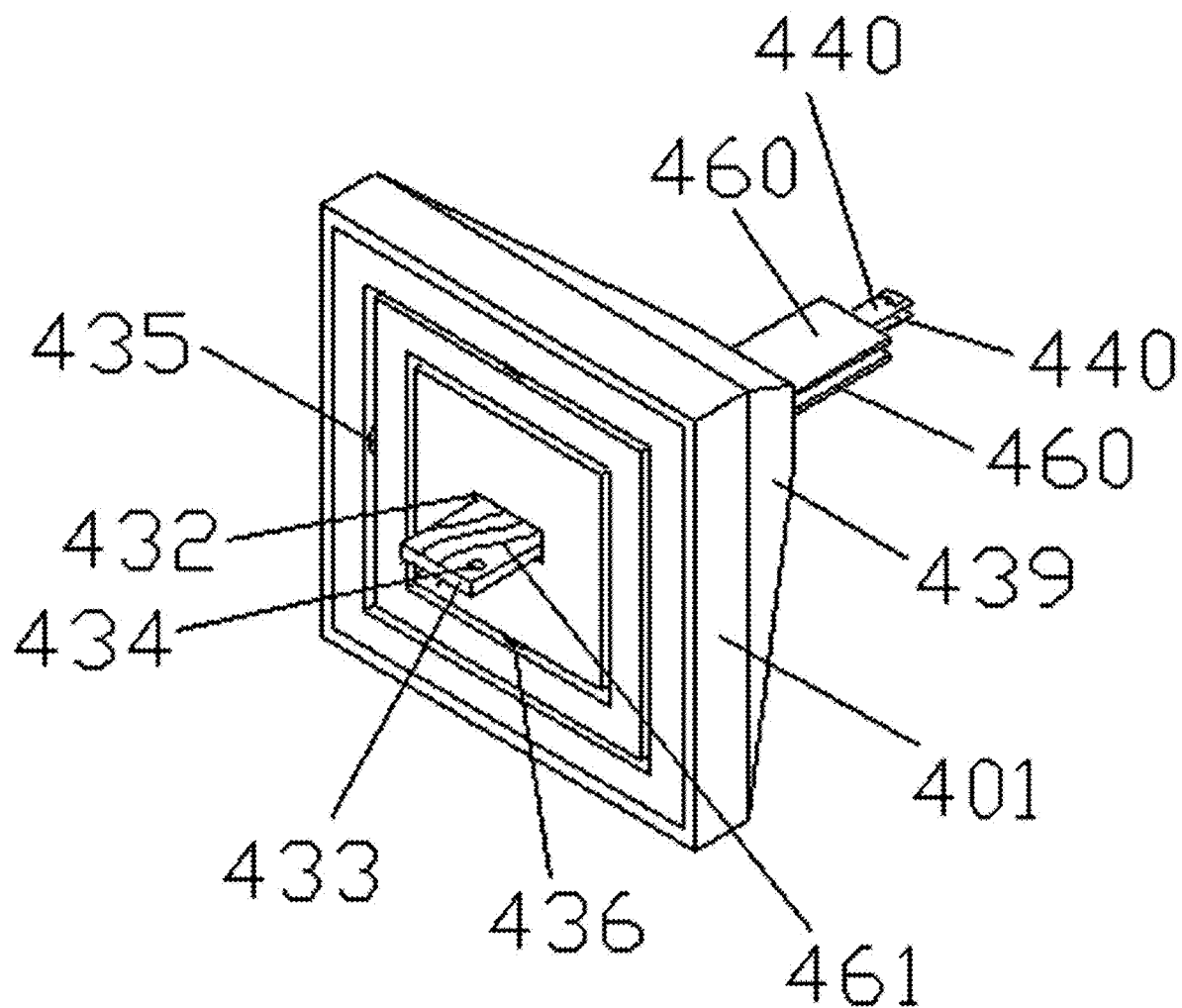
FIG. 14 is a schematic structural diagram of connection of an outer frame, a flexible wrist and a piezoelectric ceramic sheet in the second preferred embodiment of the present invention.
Figure 15:
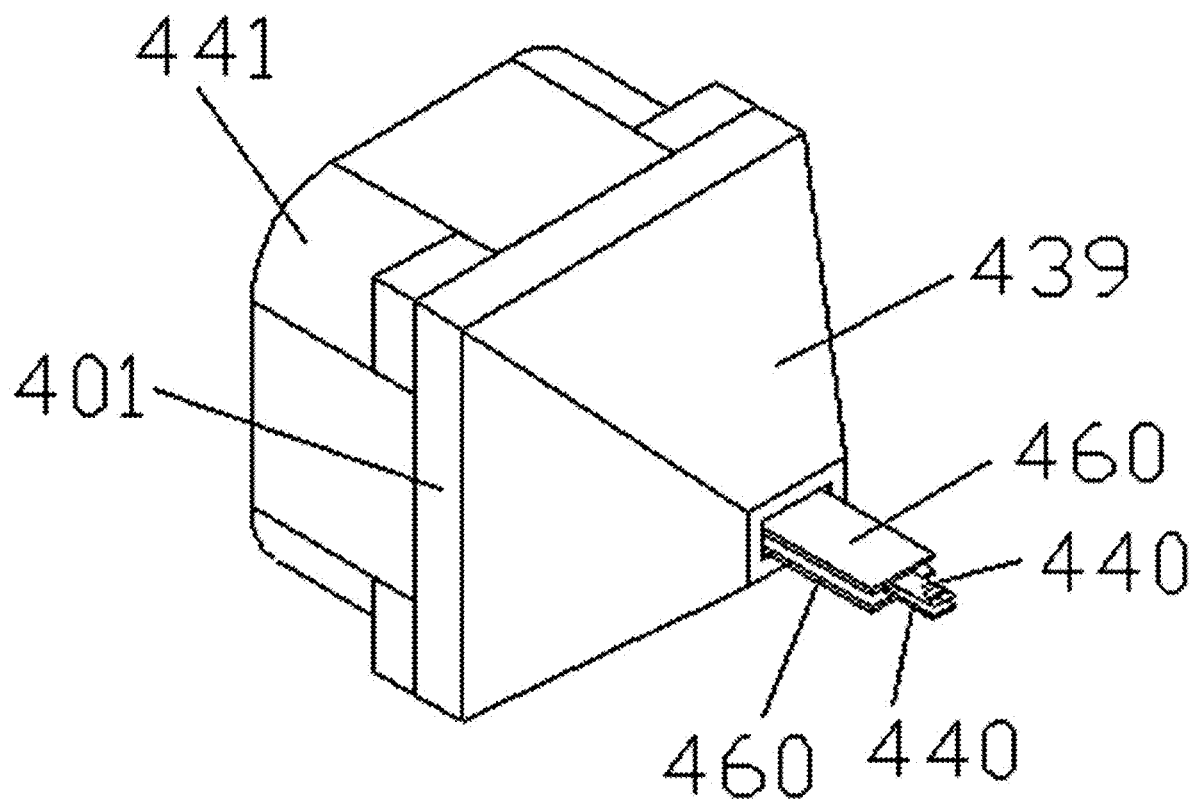
FIG. 15 is a schematic structural diagram of a clamping mechanism in the second preferred embodiment of the present invention.
Figure 16:
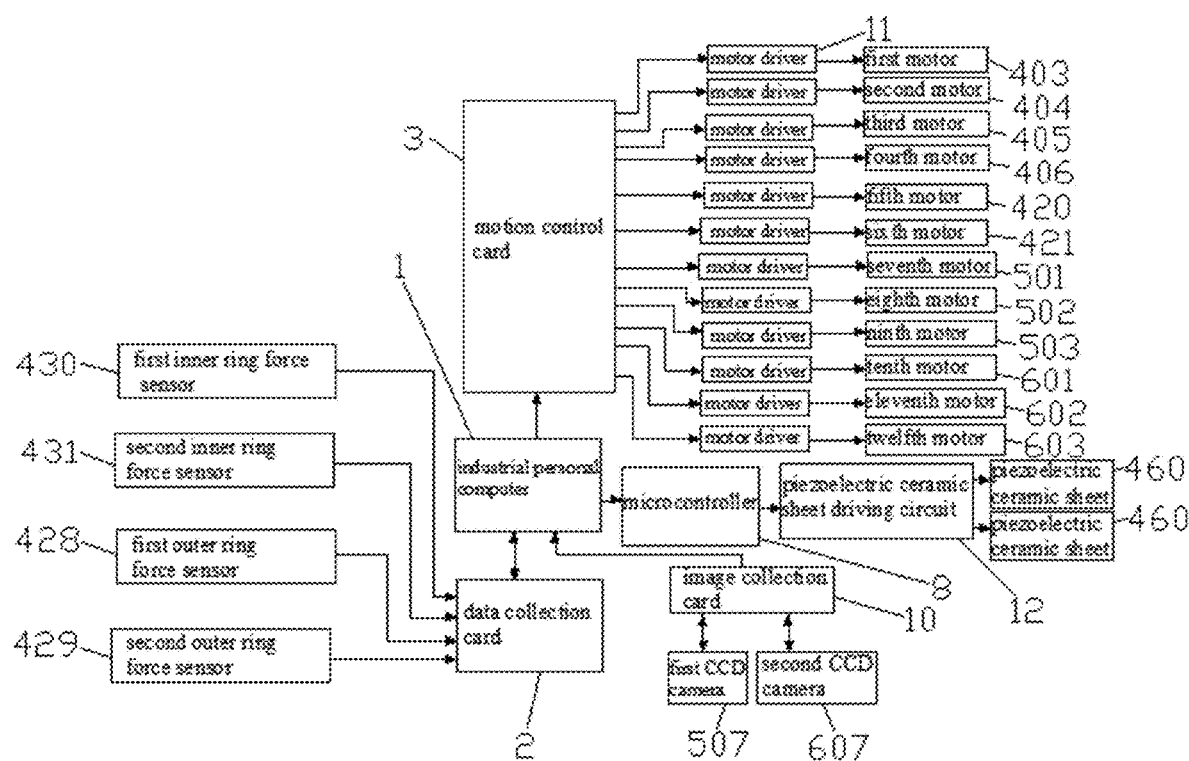
FIG. 16 is a control principle diagram in the second preferred embodiment of the present invention.

FIG. 12
430: first inner ring force sensor
431: second inner ring force sensor
428: first outer ring force sensor
429: second outer ring force sensor
3: motion control card
1: industrial personal computer
2: data collection card
11: motor driver
403: first motor
404: second motor
405: third motor
406: fourth motor
420: fifth motor
421: sixth motor
501: seventh motor
502: eighth motor
503: ninth motor
601: tenth motor
602: eleventh motor
603: twelfth motor
8: microcontroller
9: electromagnet driving circuit
438: electromagnet
10: image collection card
507: first CCD camera
607: second CCD camera
FIG. 16
430: first inner ring force sensor
431: second inner ring force sensor
428: first outer ring force sensor
429: second outer ring force sensor
3: motion control card
1: industrial personal computer
2: data collection card
11: motor driver
403: first motor
404: second motor
405: third motor
406: fourth motor
420: fifth motor
421: sixth motor
501: seventh motor 502: eighth motor
503: ninth motor
601: tenth motor
602: eleventh motor
603: twelfth motor
8: microcontroller
12: piezoelectric ceramic sheet driving circuit
460: piezoelectric ceramic sheet
10: image collection card
507: first CCD camera
607: second CCD camera

What is claimed is:

1. A flexible assembly system, comprising an industrial personal computer, a data collection card, a motion control card, a six-degree-of-freedom assembly platform, a first visual platform, a second visual platform and a supporting platform; wherein the data collection card and the motion control card are both connected with the industrial personal computer, the six-degree-of-freedom assembly platform comprises a four-degree-of-freedom motion platform and a two-degree-of-freedom adjustment device, the two-degree-of-freedom adjustment device comprises a two-degree-of-freedom motion platform and a clamping mechanism mounted on the two-degree-of-freedom motion platform, and the clamping mechanism comprises an outer frame, a flexible wrist rotatably connected in the outer frame, two clamping sheets mounted on the flexible wrist, two driving parts corresponding to the two clamping sheets, two first force sensors provided on the outer frame and two second force sensors provided on the flexible wrist; a first image collection apparatus is mounted on the first visual platform, and a second image collection apparatus is mounted on the second visual platform.

2. The flexible assembly system according to claim 1, wherein the four-degree-of-freedom motion platform comprises a base, a first motor, a second motor, a third motor, a fourth motor, a Y-axis linear motion platform mounted on the base, an X-axis linear motion platform mounted on the Y-axis linear motion platform, a Z-axis linear motion platform mounted on the X-axis linear motion platform, and a Z-axis rotary motion platform mounted on the Z-axis linear motion platform.

3. The flexible assembly system according to claim 2, wherein the two-degree-of-freedom motion platform comprises a fifth motor, a sixth motor, an X-axis rotary motion platform and a Y-axis rotary motion platform; the fifth motor drives the X-axis rotary motion platform to rotate around the X axis, and the sixth motor drives the Y-axis rotary motion platform to rotate around the Y axis.

4. The flexible assembly system according to claim 1, wherein the flexible wrist comprises an outer ring and an inner ring, the outer ring is rotatably connected with the outer frame, and the inner ring is rotatably connected with the outer ring; the two clamping sheets are mounted on the inner ring; the two first force sensors are a first outer ring force sensor and a second outer ring force sensor respectively, the two second force sensors are a first inner ring force sensor and a second inner ring force sensor respectively, the first outer ring force sensor and the second outer ring force sensor are oppositely mounted on the outer frame, the first inner ring force sensor and the second inner ring force sensor are oppositely mounted on the outer ring, and the first inner ring force sensor, the second inner ring force sensor, the first outer ring force sensor and the second outer ring force sensor are all connected with the data collection card.

5. The flexible assembly system according to claim 4, wherein a mounting hole is provided in the inner ring, a middle part of the mounting hole is connected with a balancing weight, and the balancing weight is provided with at least one balancing weight hole.

6. A flexible assembly method, in which the system according to claim 4 is used, comprising the following steps:
   (1) a first to-be-assembled part is placed in a clamping region, and a second to-be-assembled part is placed on the supporting platform;
   (2) the two clamping sheets are controlled by the industrial personal computer to clamp the first to-be-assembled part;
   (3) the industrial personal computer controls the first visual platform and the second visual platform to move through the motion control card, such that the first image collection apparatus and the second image collection apparatus are located at optimal viewing angle positions;
   (4) the industrial personal computer acquires image signals of the first image collection apparatus and the second image collection apparatus, so as to obtain a position and a posture of the second to-be-assembled part, controls the six-degree-of-freedom assembly platform to roughly adjust the posture of the first to-be-assembled part, then controls the two-degree-of-freedom adjustment device to stabilize the clamping state of the first to-be-assembled part, and then slowly finishes fine adjustment of the posture of the first to-be-assembled part in a process of controlling the first to-be-assembled part to approach the second to-be-assembled part through the six-degree-of-freedom assembly platform; and
   (5) in a stage of assembly contact between the first to-be-assembled part and the second to-be-assembled part, the industrial personal computer acquires a force signal for clamping the first to-be-assembled part through the data collection card, and in a deep assembly stage, the industrial personal computer controls the six-degree-of-freedom assembly platform through the motion control card to perform fine movement adjustment, so as to finally complete the assembly of the first to-be-assembled part and the second to-be-assembled part.

7. The flexible assembly method according to claim 6, wherein the step (4) that the industrial personal computer controls the two-degree-of-freedom adjustment device to stabilize the clamping state of the first to-be-assembled part comprises:
   when the industrial personal computer detects a force signal of the first outer ring force sensor, the outer ring is in a state of deflecting leftwards around the X axis in the positive direction of the X axis, and the industrial personal computer controls a two-degree-of-freedom rotary platform to deflect rightwards around the X axis in the positive direction of the X axis; when the industrial personal computer detects that the force signal of the first outer ring force sensor is less than a certain threshold, the outer ring and the first outer ring force sensor are in a contact-free state or an unstressed state;
   when the industrial personal computer detects a force signal of the second outer ring force sensor, the outer ring is in a state of deflecting rightwards around the X axis in the positive direction of the X axis, and the industrial personal computer controls the two-degree-of-freedom rotary platform to deflect leftwards around the X axis in the positive direction of the X axis; when the industrial personal computer detects that the force signal of the second outer ring force sensor is less than a certain threshold, the outer ring and the second outer ring force sensor are in a contact-free state or an unstressed state;

when the industrial personal computer detects a force signal of the first inner ring force sensor, the inner ring is in a state of deflecting leftwards around the Y axis in the positive direction of the Y axis, and the industrial personal computer controls the two-degree-of-freedom rotary platform to deflect rightwards around the Y axis in the positive direction of the Y axis; when the industrial personal computer detects that the force signal of the first inner ring force sensor is less than a certain threshold, the inner ring and the first inner ring force sensor are in a contact-free state or an unstressed state;

when the industrial personal computer detects a force signal of the second inner ring force sensor, the inner ring is in a state of deflecting rightwards around the Y axis in the positive direction of the Y axis, and the industrial personal computer controls the two-degree-of-freedom rotary platform to deflect leftwards around the Y axis in the positive direction of the Y axis; when the industrial personal computer detects that the force signal of the second inner ring force sensor is less than a certain threshold, the inner ring and the second inner ring force sensor are in a contact-free state or an unstressed state;

when in the contact-free state or the unstressed state, the outer ring, the first outer ring force sensor and the second outer ring force sensor are in a stable state, and adjustment of the outer ring is finished;

when in the contact-free state or the unstressed state, the inner ring, the first inner ring force sensor and the second inner ring force sensor are in a stable state, and adjustment of the inner ring is finished;

when the adjustment of both the outer ring and the inner ring is finished, adjustment of the currently clamped first to-be-assembled part is finished, and the first to-be-assembled part in a stable state.

8. The flexible assembly system according to claim 1, wherein each of the clamping sheets is an iron sheet, and the driving part is an electromagnet.

9. The flexible assembly system according to claim 1, wherein each of the clamping sheets is a piezoelectric ceramic sheet, and the driving part comprises three metal wires.

10. The flexible assembly system according to claim 9, wherein the metal wire has a diameter of 20 μm.

* * * * *